United States Patent
Goto et al.

[19]

[11] Patent Number: 6,052,538
[45] Date of Patent: Apr. 18, 2000

[54] CAMERA AND EXPOSURE CONTROL METHOD

[75] Inventors: Shigenori Goto; Hisashi Hamada, both of Saitama, Japan

[73] Assignees: Fuji Photo Optical Co., Ltd., Saitama; Fuji Photo Film Co., Ltd., Kanagawa, both of Japan

[21] Appl. No.: 08/987,350

[22] Filed: Dec. 9, 1997

[30] Foreign Application Priority Data

Dec. 12, 1996 [JP] Japan .................................... 8-332495

[51] Int. Cl.[7] ..................................................... G03B 7/00
[52] U.S. Cl. ........................................... 396/210; 396/299
[58] Field of Search ...................................... 396/207, 210, 396/299, 297, 281, 284

[56] References Cited

U.S. PATENT DOCUMENTS

| | | | |
|---|---|---|---|
| 4,579,433 | 4/1986 | Ishizaka et al. | 396/281 X |
| 4,676,616 | 6/1987 | Hoda et al. | 396/207 |
| 4,693,574 | 9/1987 | Ohnuki et al. | 396/299 |
| 5,596,381 | 1/1997 | Murakami et al. | 396/207 |
| 5,845,869 | 12/1998 | Makino | 242/584.1 |

*Primary Examiner*—W. B. Perkey
*Attorney, Agent, or Firm*—Young & Thompson

[57] ABSTRACT

A roll photo film includes a photo filmstrip having an effective exposure region in which plural frames are formable one after another. Light-shielding leader and trailer are disposed on respective ends of the photo filmstrip. The roll photo film is pre-wound with the trailer wound inwards and with the leader wound outwards. A bar code is prerecorded between a front end of the leader and the effective exposure region, represents information of an auto input photosensitivity value. A camera is used with the roll photo film. In the camera, a bar code reader reads the bar code to detect the auto input photosensitivity value. A photosensitivity dial is externally operable, and inputs a manual input photosensitivity value. A mode selector, in combination of a pointer and a movable indicia, is externally operable, and selects one of automatic and manual modes. The auto input photosensitivity value becomes effective when selecting the automatic mode. The manual input photosensitivity value becomes effective when selecting the manual mode. An exposure control unit controls an amount of exposure to the effective exposure region in accordance with an effective one of the auto and manual input photosensitivity values.

28 Claims, 14 Drawing Sheets

F I G. 2
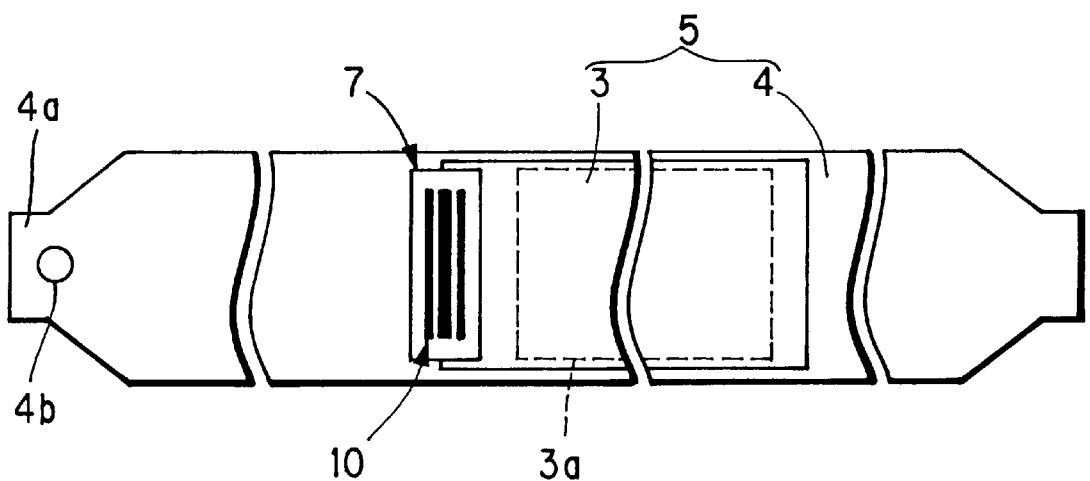
F I G. 3
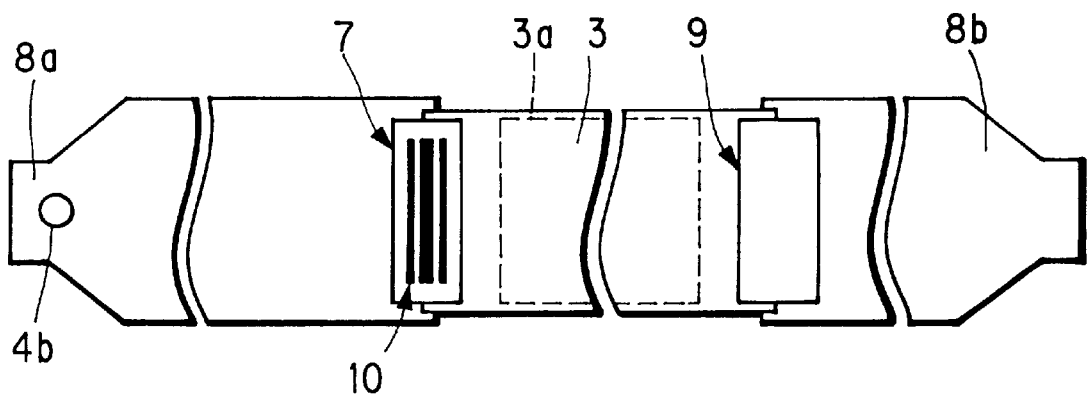

F I G. 12
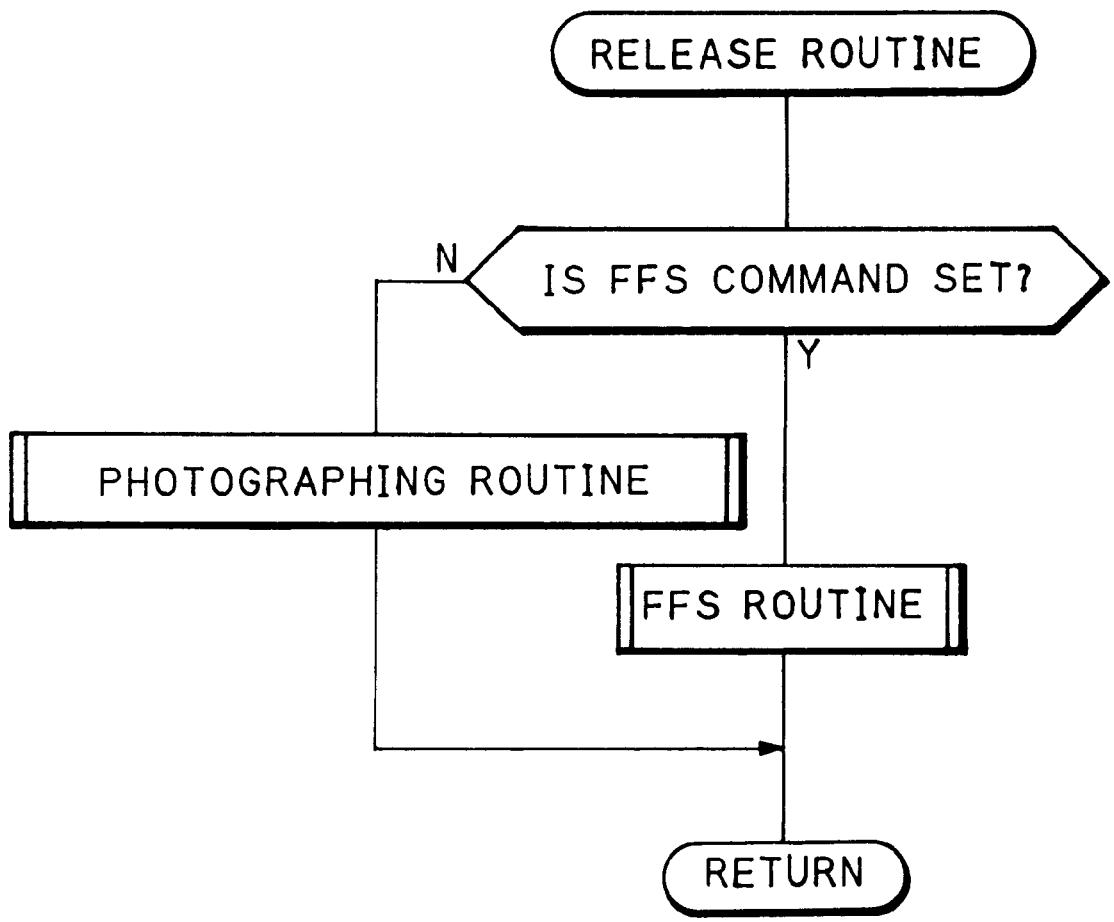

CAMERA AND EXPOSURE CONTROL METHOD

BACKGROUND OF THE INVENTION

1. Field of the Invention

The present invention relates to a camera and an exposure control method. More particularly, the present invention relates to a camera and an exposure control method in which information of photosensitivity of photo film to be used for exposure control can be input both manually and automatically.

2. Description Related to the Prior Art

A camera of the Brownie type is used with 120 or 220 type of roll photo film. There are very few cameras of this type that have automatic structures of focussing and photo film loading. It is extremely complex to handle the Brownie type in contrast to compact cameras, single-lens reflex cameras and the like for use with the 135 type or the IX 240 type. There is no well-known technique of facilitating photography with high image quality with a camera of the Brownie type, except for very recently marketed models of this type incorporating an autofocussing device.

A roll photo film does not have an information signaling portion like a DX code of an 135 photo film cassette disposed outside its cassette shell. The roll photo film has no such structure for sending a camera photo film information including photosensitivity of the roll photo film, the number of available frames of the photo filmstrip of the roll photo film and the like. It is general that the camera for use with the roll photo film has a photosensitivity dial, in which a train of numerals is disposed on the dial for indicating values of the photosensitivity. A pointer is disposed on the camera body and near to the dial, and adapted to pointing one of the numerals of the dial being rotated, for selectively inputting manual input photosensitivity information to the camera.

There is a commonly assigned co-pending patent application U.S. Ser. No. 08/712,387, now U.S. Pat. No. 5,845, 869 (corresponding to EP-A 0 763 768), in which an adhesive connective tape in connection with the light-shielding sheet and the photo filmstrip has a prerecorded bar code. The camera automatically reads the bar code, and sets the photosensitivity for exposure control.

In most cases of taking a photograph, the photosensitivity is input in the camera at an equal value to the nominal value of the photosensitivity of the roll photo film to be exposed. Consequently the automatic photosensitivity setting system is more convenient than, and advantageous over, the manual photosensitivity setting system. However skilled amateur photographers or professional photographers frequently wish to input the photosensitivity changed from the nominal value by a certain amount, for example from ⅓ EV to 2 EV. Assuming that the roll photo film is negative color photo film with the photosensitivity of ISO 100, the contrast would be heightened if the photosensitivity is raised by +⅓ EV to set ISO 80 in a temporary manner. A photograph taken against back light would be acceptably taken if the photosensitivity is raised by +2 EV to set ISO 25 in a temporary manner. However there has been no known structure in which photosensitivity information of photo film to be used for the exposure control would be set both manually and automatically. Such users as skilled amateur photographers and professional photographers have not been satisfied with known cameras of the Brownie type.

SUMMARY OF THE INVENTION

In view of the foregoing problems, an object of the present invention is to provide a camera and an exposure control method in which photosensitivity information of photo film to be used for exposure control can be set both manually and automatically.

In order to achieve the above and other objects and advantages of this invention, a camera is used with a roll photo film. The roll photo film includes a photo filmstrip having an effective exposure region in which plural frames are formable one after another. A light-shielding leader is disposed on a front end of the photo filmstrip. A light-shielding trailer is disposed on a rear end of the photo filmstrip. The roll photo film is pre-wound with the trailer wound inwards and with the leader wound outwards. A bar code is prerecorded between a front end of the leader and the effective exposure region, for representing photo film information including information of an auto input photosensitivity value. The camera has a bar code reader which reads the bar code to detect the auto input photosensitivity value. A variable photosensitivity input unit is externally operable, for inputting a manual input photosensitivity value. A mode selector is externally operable, for selecting one of automatic and manual modes, the mode selector rendering the auto input photosensitivity value effective when selecting the automatic mode, and rendering the manual input photosensitivity value effective when selecting the manual mode. An exposure control unit controls an amount of exposure to the effective exposure region in accordance with an effective one of the auto and manual input photosensitivity values.

In a preferred embodiment, a memory stores the auto input photosensitivity value read by the bar code reader, and when the automatic mode is selected in the mode selector, the auto input photosensitivity value being read from the memory as effective.

To be precise, there is a camera body. A photo film loader chamber is formed in the camera body, and loaded with the roll photo film. A photo film take-up chamber is formed in the camera body, for taking up the roll photo film with the leader advanced thereto. An exposure aperture is formed in the camera body and disposed between the loader chamber and the take-up chamber, for providing the effective exposure region with an exposure. The bar code reader is disposed between the exposure aperture and the loader chamber, and reads the bar code while the leader is wound into the take-up chamber and before a first one of the frames of the effective exposure region is set on the exposure aperture.

An aperture stop mechanism is incorporated in the camera body, disposed in front of the exposure aperture, for controlling an amount of a subject light introduced into the effective exposure region. A shutter mechanism is incorporated in the camera body, disposed in front of the exposure aperture, operated to open/close for take the exposure to the effective exposure region. In accordance with greatness of the auto or manual input photosensitivity value, the exposure control unit controls the aperture stop mechanism to set a smaller aperture therein, and/or controls the shutter mechanism to set a higher shutter speed therein.

Furthermore, the photosensitivity input unit has plural preset values of manual input photosensitivity from which the manual input photosensitivity value is selected.

The roll photo film further includes a connective tape for securing the leader to the photo filmstrip, the bar code being disposed on the connective tape, and including plural bars arranged in a longitudinal direction of the photo filmstrip.

A display device indicates which of the automatic and manual modes is selected.

Moreover, there is a take-up spool which is disposed in the take-up chamber in a removable manner, on which the front end of the leader is retained and which winds the roll photo film therearound when rotated. A drive shaft is engaged with the take-up spool, for rotating the take-up spool. A first rotary encoder generates a pulse representing a unit axial rotating amount of the drive shaft, the unit axial rotating amount corresponding to a unit transported amount of the roll photo film. A counter counts the pulse to detect an axial rotating amount of the drive shaft. The bar code reader includes a photo sensor for detecting a reflection level of the bar code. A control unit obtains a distance where the reflection level of the bar code is stable by referring to the axial rotating amount in response to signals from the counter and the photo sensor, so as to obtain a width of the bars.

The display device is a liquid crystal display panel.

The roll photo film is a 120 and/or 220 type of photo film.

BRIEF DESCRIPTION OF THE DRAWINGS

The above objects and advantages of the present invention will become more apparent from the following detailed description when read in connection with the accompanying drawings, in which:

FIG. 2 is a plan illustrating a spread state of the roll photo film of the 120 type;

FIG. 3 is a plan illustrating a spread state of the roll photo film of the 220 type;

FIG. 12 is a flow chart illustrating a release routine;

DETAILED DESCRIPTION OF THE PREFERRED EMBODIMENTS OF THE PRESENT INVENTION

Figure 1:
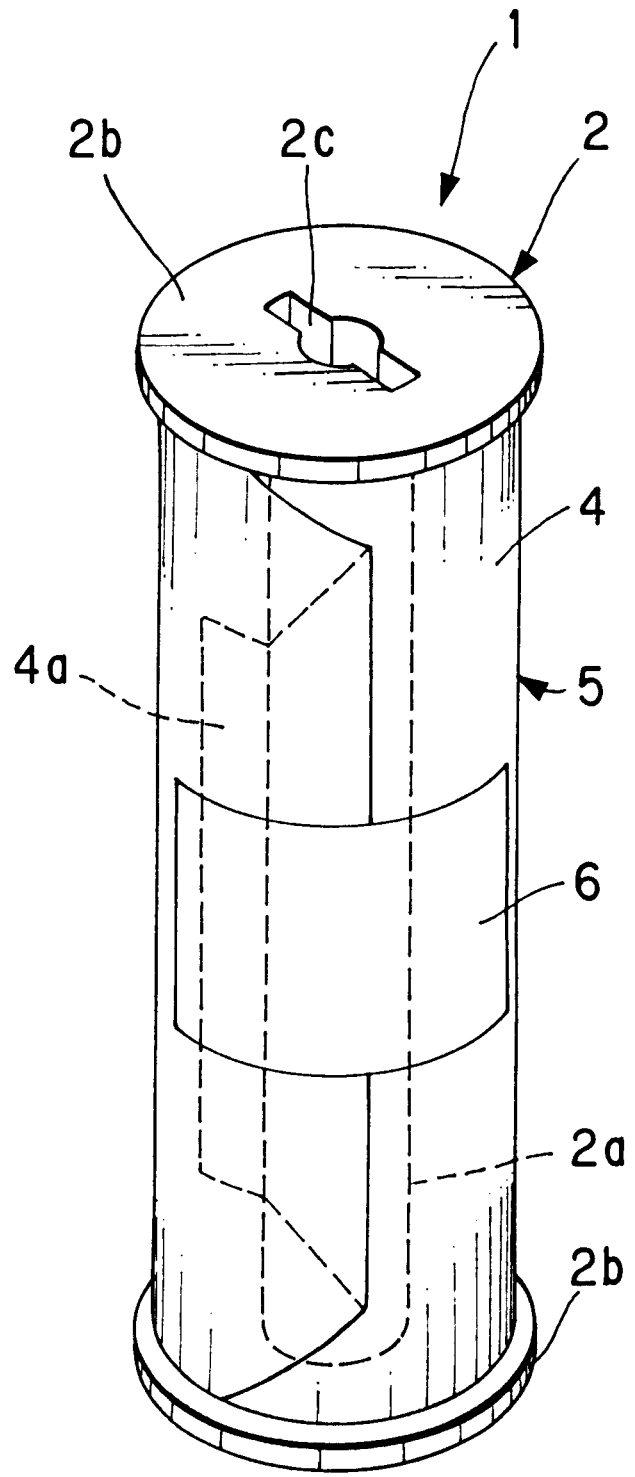
FIG. 1 is a perspective illustrating a roll photo film.

In FIG. 1, a roll photo film 1 of the 120 type or the 220 type is depicted. A combination of a photo filmstrip 3 with a light-shielding sheet 4 constitutes a sheet-fitted photo film 5, and wound about a spool core 2a of a spool 2. For the photo filmstrip 3, see FIG. 2. A leader portion 4a of the light-shielding sheet 4 is folded back, and secured by an adhesive closing tape 6 to the outside of the roll of the sheet-fitted photo film 5. There are flanges 2b formed on respective axial ends of the spool 2. An axial hole 2c is formed in the center of the flanges 2b.

When a shaft incorporated in a camera is inserted in the axial hole 2c, the roll photo film 1 is supported in a photo film loader chamber in a rotatable manner. After the spool 2 is removed from the sheet-fitted photo film 5 unwound and used up, the spool 2 is used as a second spool or take-up spool placed in the loader chamber. When the spool 2 becomes the take-up spool, a drive shaft of the camera is engaged with the axial hole 2c and causes it to rotate.

In FIG. 2, the sheet-fitted photo film 5 of the roll photo film 1 of the 120 type is illustrated in a flattened condition spread from about the spool 2. To be precise there are two types including the 120 standard type and the 120 half type. The photo filmstrip 3 of the 120 standard type is approximately 825 mm long. The photo filmstrip 3 of the 120 half type is half as long as the photo filmstrip 3 of the 120 standard type. The number of available frames depends upon the photo film length and also the frame size. Assuming that the frame size is 41.5×56 mm referred to as semi-brownie size, the available frame number of the photo filmstrip 3 is 15 for the 120 standard type, and eight (8) for the 120 half type. Note that a reference numeral 3a designates an effective exposure region where frames are formable.

The light-shielding sheet 4 is longer than the photo filmstrip 3, and has a hole 4b formed in the leader portion 4a to retain a claw of the take-up spool. A back surface of the photo filmstrip 3 is overlaid on a black back surface of the light-shielding sheet 4. The photo filmstrip 3 is connected to the light-shielding sheet 4 via an adhesive or connective tape 7 at the end of the photo filmstrip 3.

In FIG. 3, the sheet-fitted photo film 5 of the 220 type is depicted. The light-shielding sheet 4 is split into a leader sheet 8a and a trailer sheet 8b. The leader sheet 8a is connected to a front end of the photo filmstrip 3 via the connective tape 7. The trailer sheet 8b is connected to a rear end of the photo filmstrip 3 via an adhesive or connective tape 9. The leader portion 4a of the leader sheet 8a has the hole 4b in a manner similar to the 120 type. The photo filmstrip 3 of the 220 type is approximately two times as long as the photo filmstrip 3 of the 120 standard type. Assuming that the frame size is the semi-brownie size, the available frame number of the 220 type is 30. The connective tape 7, as viewed in the longitudinal direction of the photo filmstrip 3, has a width equal to or less than 25 mm determined according to the ISO standards, for example a width of 24 mm.

Figure 4:
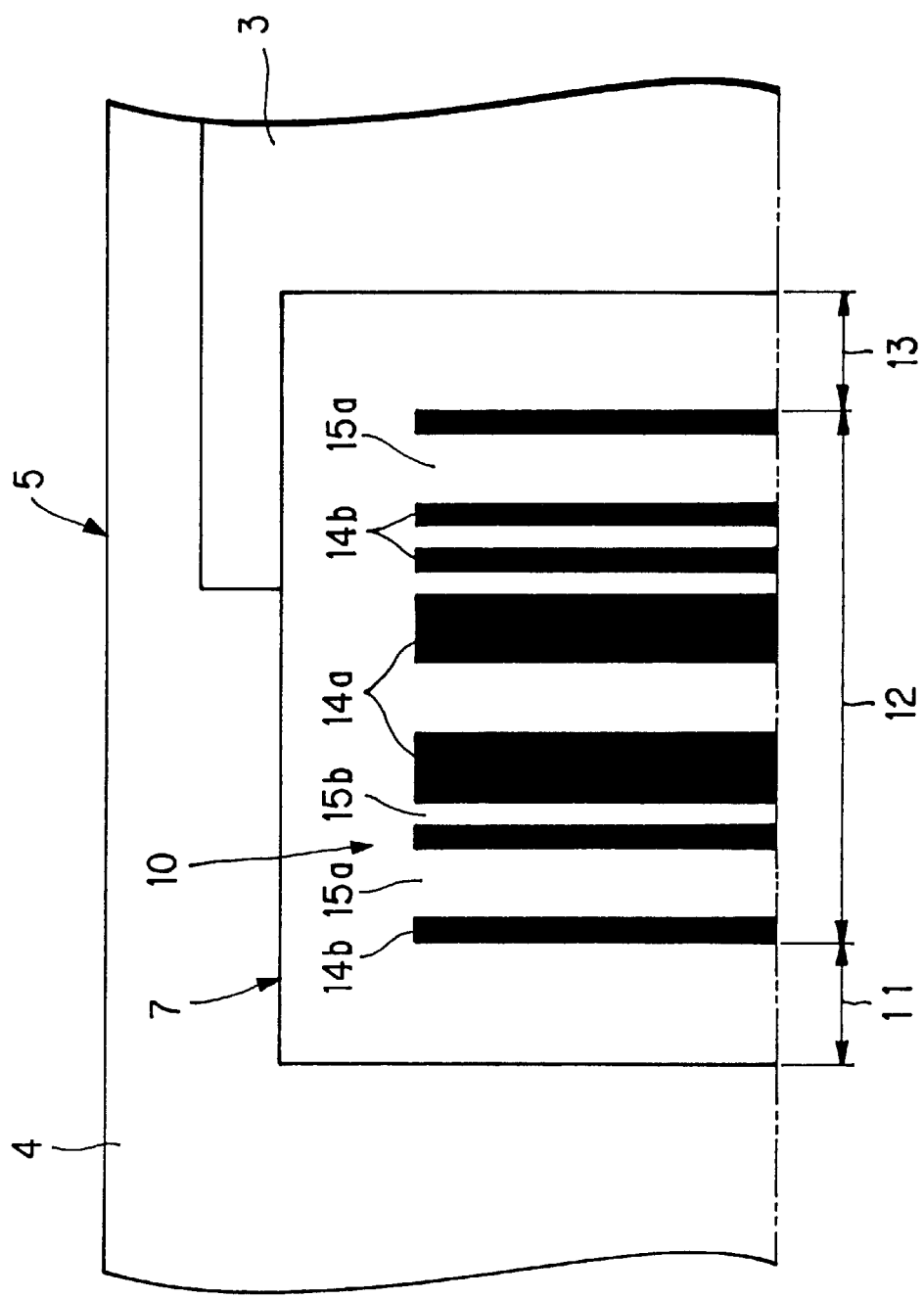
FIG. 4 is a plan, partially cutaway, illustrating a bar code on a connective tape of the roll photo film.

A bar code 10 is prerecorded on the connective tape 7. In FIG. 4, an example of the bar code 10 is depicted. The bar code 10 consists of a combination of black bars printed on a white surface of the connective tape 7 and arranged in a longitudinal direction of the photo filmstrip 3. The bar code 10 includes a starting quiet zone 11, a data bar section 12 and an ending quiet zone 13 arranged in a direction away from the leader portion 4a. The starting quiet zone 11 and the ending quiet zone 13 are white and have a high reflection level. The data bar section 12 includes black bars having a low reflection level and white bars having a high reflection level.

The starting quiet zone 11 defines a starting position of the bar code 10. The ending quiet zone 13 defines an ending position of the bar code 10. The data bar section 12 is a combination of wide black bars 14a, narrow black bars 14b, wide white bars 15a and narrow white bars 15b, and includes seven black bars 14a and 14b alternately arranged with six white bars 15a and 15b. The beginning and the end of the data bar section 12 are constituted by one of the black bars. The data bar section 12 represents information including type information for one of the 120 standard type, the 120 half type and the 220 type, photosensitivity information for speed of the photo filmstrip 3, and classification information for one of the monochromatic photo film, negative photo film and reversal photo film.

The wide black bar 14a and the wide white bar 15a are 2.5 times as wide as the narrow black bar 14b and the narrow white bar 15b. Each of the bars consists of one bit. The wide black bar 14a and the wide white bar 15a represent a logical value of one (1). The narrow black bar 14b and the narrow white bar 15b represent a logical value of zero (0). Those logical values are irrespective of the difference between black and white.

The beginning three bars of the data bar section 12 are black, white and black for three bits, and used to represent the type information of the roll photo film 1. The type information indirectly represents information of a length of the photo filmstrip 3.

In the 120 standard type, the beginning three bars next to the starting quiet zone 11 are the narrow black bar 14b, the wide white bar 15a and the narrow black bar 14b in the order listed, to represent the type data of "010". In the 120 half type, the beginning three bars represent the type data of "001". In the 220 type, the beginning three bars represent the type data of "100".

The ending ten bars of the data bar section 12 are the five white bars and the alternate five black bars for ten bits, and used to represent the classification information and the photosensitivity information of the photo filmstrip 3. Note that a term "white code" is herein used as a value of a 5-bit code constituted by those five white bars in the ending ten bars. A term "black code" is used as a value of a 5-bit code constituted by the five black bars in the ending ten bars.

TABLE

| 5 bits of white/black code | Values of white/black code |
|---|---|
| 0 0 1 1 0 | 0 |
| 1 0 0 0 1 | 1 |
| 0 1 0 0 1 | 2 |
| 1 1 0 0 0 | 3 |
| 0 0 1 0 1 | 4 |
| 1 0 1 0 0 | 5 |
| 0 1 1 0 0 | 6 |
| 0 0 0 1 1 | 7 |
| 1 0 0 1 0 | 8 |
| 0 1 0 1 0 | 9 |

If the five white bars are "narrow, wide, narrow, narrow and wide" in the order listed, then they represent the white code of "2". If the five white bars are "narrow, narrow, narrow, wide and wide" in the order listed, then they represent the white code of "7". If the five black bars are "narrow, wide, narrow, narrow and wide" in the order listed, then they represent the black code of "2". If the five black bars are "wide, wide, wide, narrow and narrow" in the order listed, then they represent the black code of "3". If the white code is "0", "4" or "7", then it represents a monochromatic photo film. If the white code is "1", "5" or "8", then it represents a reversal photo film. If the white code is "2", "6" or "9", then it represents a negative photo film. If the white code is "3", then it represents any type of photo film different from monochromatic, reversal and negative photo film.

Assuming that the black code has the value "3", if the white code has the value "0", "1" or "2", then this represents the photosensitivity ISO 100. If the white code has the value "4", "5" or "6", then this represents the photosensitivity ISO 125. If the white code has the value "7", "8" or "9", then this represents the photosensitivity ISO 160. Assuming that the black code has the value "5", if the white code has the value "0", "1" or "2", then this represents the photosensitivity ISO 400. If the white code has the value "4", "5" or "6", then this represents the photosensitivity ISO 500. If the white code has the value "7", "8" or "9", then this represents the photosensitivity ISO 640. In FIG. 4, the bar code 10 for the photo filmstrip 3 represents that the photo filmstrip 3 is negative color photo film having photosensitivity ISO 100 and of the 120 standard type.

Figure 5:
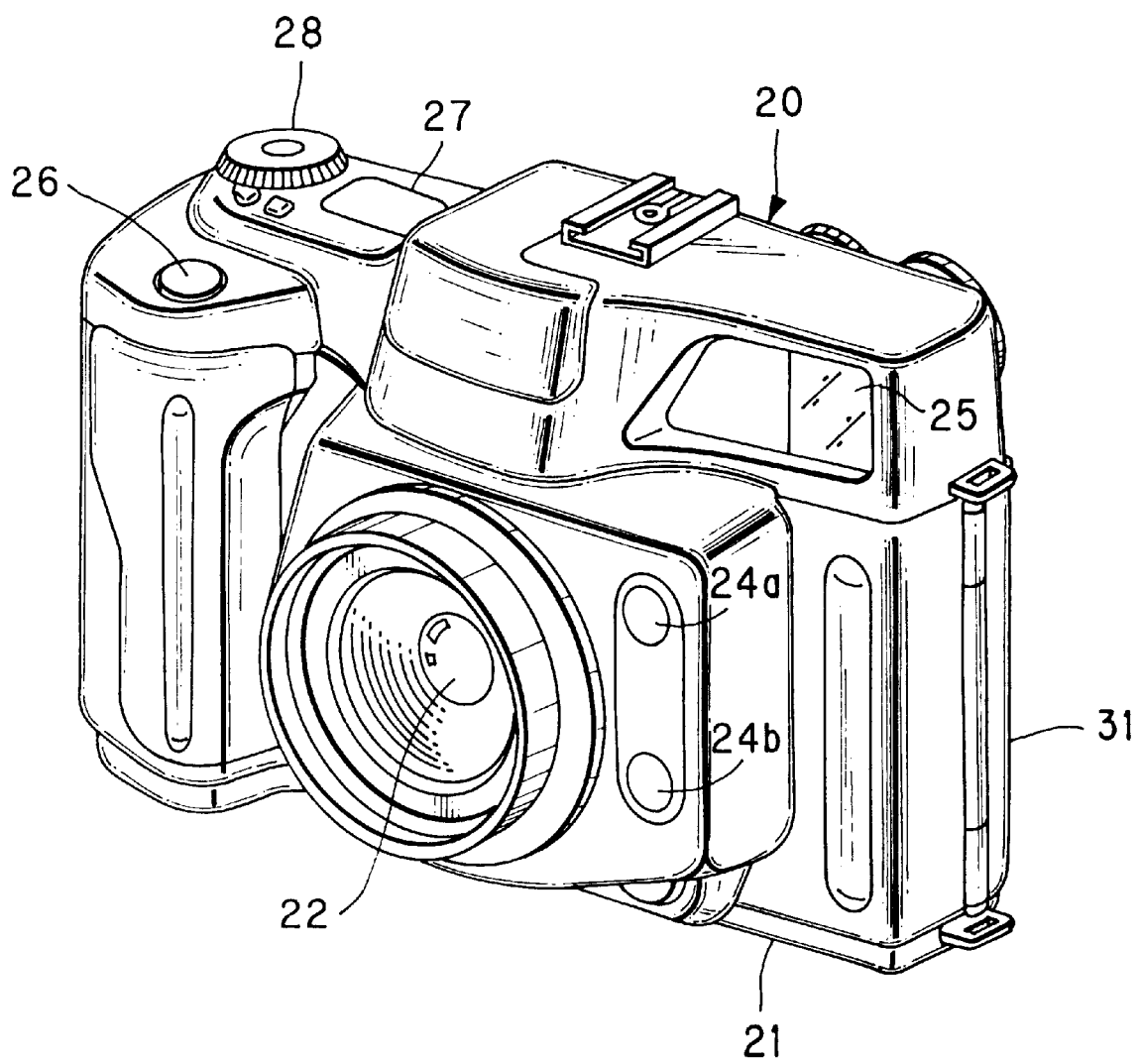
FIG. 5 is a perspective illustrating a Brownie camera.

In FIG. 5, a camera 20 of the Brownie type is illustrated. The camera 20 is constructed to take an exposure at the semi-brownie size. If the roll photo film 1 is the 220 type, the available frame number is 30. Of course the available frame number is 15 for the 120 standard type, and eight (8) for the 120 half type.

In a front surface of a camera body 21, there are a taking lens 22, a rangefinding windows 24a and 24b and a viewfinder 25. The rangefinding windows 24a and 24b operate for an autofocussing (AF) operation. A top of the camera body 21 has a shutter release button 26, a liquid crystal display panel 27 and a photosensitivity dial 28 as a variable photosensitivity input unit. The LCD panel 27 displays information required for taking exposures. The photosensitivity dial 28 is circular and adapted to manually or automatically setting photosensitivity of the photo film for the purpose of control of the exposure.

Figure 6:
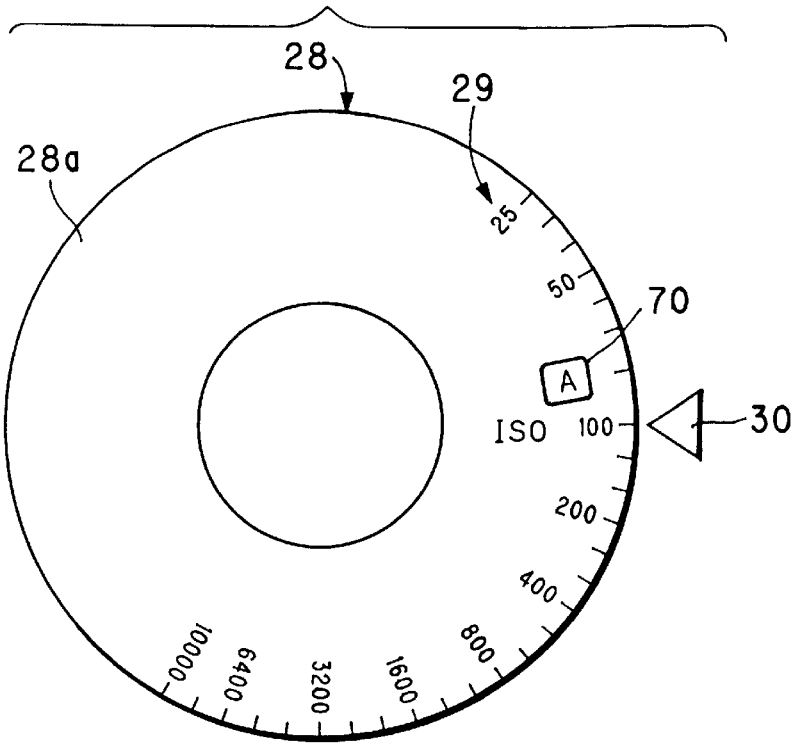
FIG. 6 is an explanatory view in plan, illustrating a photosensitivity dial and a pointer for use therewith.

In FIG. 6, a top surface 28a of the photosensitivity dial 28 is depicted. An arc-shaped train 29 of numerals is printed, formed, or by any means recorded on the top surface 28a, and arranged inside its periphery. The numerals of the numeral train 29 are values of ISO photosensitivity according to the ISO standards, and for example from ISO 25 to ISO 10,000 at an interval of ⅓ EV. There is a letter A of an auto input indicia 70, disposed next to the numeral of ISO 100, for indicating an automatic photosensitivity setting mode. The reason for this disposition near to ISO 100 is that ISO 100 is used very frequently and that designation of the letter "A" of the auto input indicia 70 is convenient.

Figure 7:
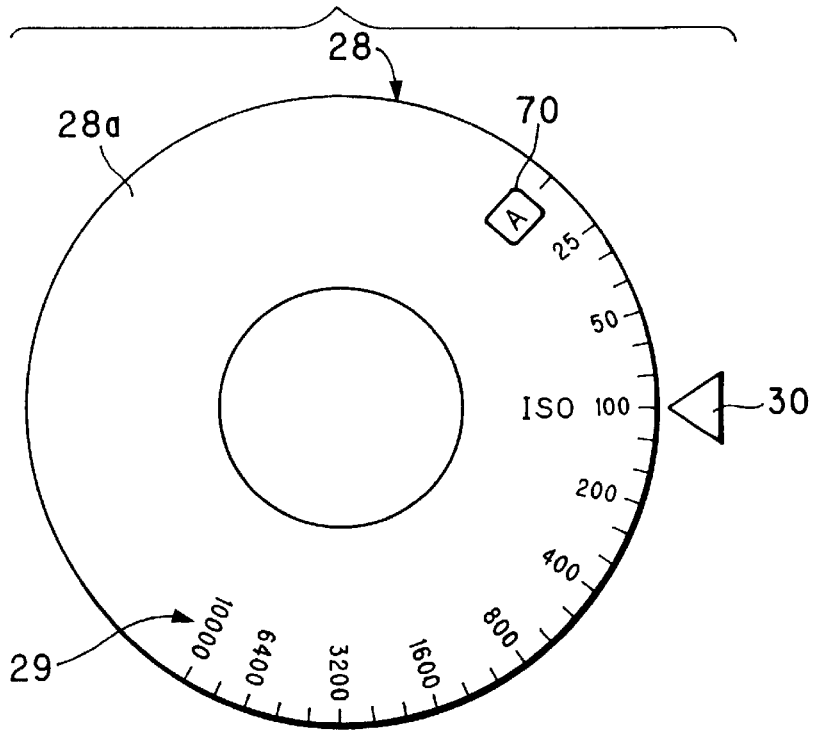
FIG. 7 is an explanatory view in plan, illustrating another preferred photosensitivity dial and the pointer.

When the photosensitivity dial 28 is rotated to set any one of the numerals of the numeral train 29 at a pointer 30 formed on the top of the camera body 21, then the camera is in a manual photosensitivity setting mode where desired photosensitivity is set manually. When the letter A of the auto input indicia 70 is set at the pointer 30, then the camera is in the automatic photosensitivity setting mode where photosensitivity read from the bar code 10 of the roll photo film 1 is set automatically. The pointer 30 constitutes a photosensitivity input device and a mode selector. In FIG. 6, the letter A of the auto input indicia 70 may be disposed near to the numeral of ISO 100, which is considerably frequent. It is to be noted that the letter A of the auto input indicia 70 may be disposed at an end of the numeral train 29 as illustrated in FIG. 7. With both of those dispositions, the manual and automatic photosensitivity setting modes can be selectively set with great ease and rapidly.

The taking lens 22 is focussed to a photographic subject according to its subject distance measured by use of the rangefinding windows 24a and 24b. The shutter release button 26 is depressible to a halfway depressed position and a fully depressed position deeper than the halfway depressed position. A release switch 57 is associated with the shutter release button 26. See FIG. 9. When the shutter release button 26 is depressed only to the halfway depressed position, then the camera effects operation of focussing the photographic subject and measuring the subject brightness of the subject. When the shutter release button 26 is depressed only to the fully depressed position, then the shutter mechanism is released to take an exposure. Also the shutter release button 26 is an operable device for operation of initial advancement of the photo filmstrip to set one first frame at the exposure aperture.

Figure 8:
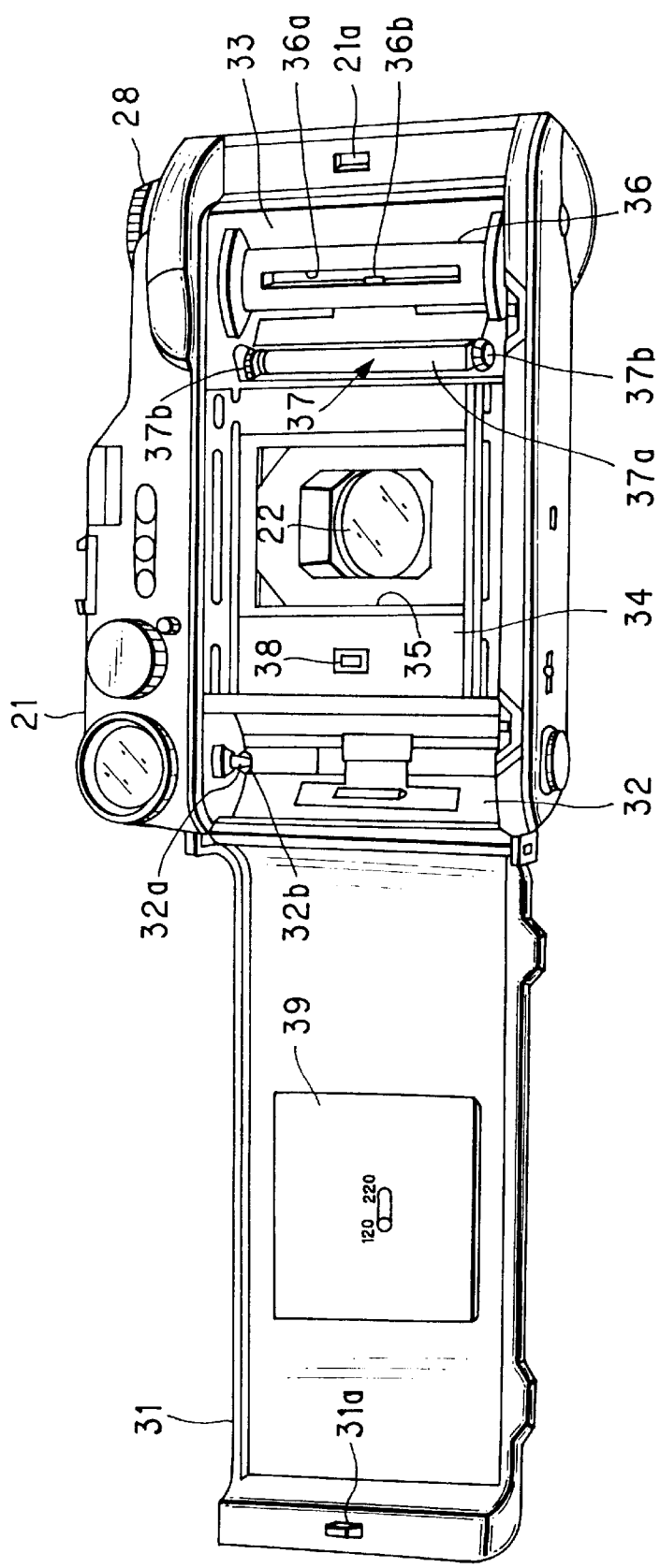
FIG. 8 is a perspective illustrating the camera of which a back lid is open.

In FIG. 8, the rear of the camera body 21 is illustrated with a back lid 31 opened. There are a photo film loader chamber 32 and a photo film take-up chamber 33. A photo film passageway 34 is formed to communicate between the loader chamber 32 and the take-up chamber 33. There is an exposure aperture 35, disposed in the photo film passageway 34 behind the taking lens 22, for defining the frame size of each frame on the photo filmstrip 3.

The roll photo film 1 being unused is inserted into the loader chamber 32. There is a shaft 32*a* disposed through a top wall of the loader chamber 32. The shaft 32*a* is fitted in the axial hole 2*c* of the spool 2, and supports the roll photo film 1 in a rotatable manner. A take-up spool 36 is disposed in the take-up chamber 33. The take-up spool 36 is structurally the same as the spool 2, and is derived from a previous roll photo film 1 being used.

To load the camera with the roll photo film 1, the leader portion 4*a* of the light-shielding sheet 4 is inserted in a slot 36*a* of the take-up spool 36. The take-up spool 36 has an axial hole in the center of its flange. A drive shaft 50*a* is engaged with the axial hole in the take-up spool 36, so that the sheet-fitted photo film 5 is wound about the take-up spool 36. See FIG. 9. Then a first frame of the sheet-fitted photo film 5 is set at the exposure aperture. Each one frame of the photo filmstrip is transported. After taking all the exposures, the photo filmstrip is finally wound entirely.

In the take-up spool 36, a claw 36*b* is disposed inside the slot 36*a*, and is engaged with the hole 4*b* of the light-shielding sheet 4. The use of the claw 36*b* makes it unnecessary to make two or three rotations of the take-up spool 36 before the first frame setting for the purpose of retaining the light-shielding sheet 4 thereabout.

In the take-up chamber 33 and near to the photo film passageway 34, there is a driven roller 37 adapted to detection of a transported amount of the photo filmstrip 3. The driven roller 37 is constituted by a shaft 37*a* and rubber rings 37*b* fitted on ends of the shaft 37*a*. The rubber rings 37*b* contact the sheet-fitted photo film 5, and are rotated by movement of the sheet-fitted photo film 5 in a driven manner.

A bar code sensor or photo sensor 38 of a reflection type is disposed in a wall of the photo film passageway 34 between the exposure aperture 35 and the loader chamber 32, and confronted with a path of the bar code 10 on the connective tape 7. The bar code sensor 38 projects an infrared beam to the sheet-fitted photo film 5 in the photo film passageway 34, receives the beam reflected from the sheet-fitted photo film 5, and generates a photoelectric signal at a signal level of corresponding to intensity of the received reflected beam. According to the signal level, existence of the photo filmstrip 3 is detected and also the bar code 10 is read. The use of the infrared beam at the bar code sensor 38 is for the purpose of avoiding fogging the photo filmstrip 3 with a visible beam different from the infrared beam.

The back lid 31 covers the rear of the loader chamber 32, the take-up chamber 33 and the photo film passageway 34 to avoid entry of ambient light to the inside of the camera body 21. A pressure plate 39 is disposed on an inner face of the back lid 31. The pressure plate 39 is slidable between positions for the 220 type and the 120 type. In the 220 type position, a surface of the pressure plate 39 is relatively near to the exposure aperture 35. In the 120 type position, the surface of the pressure plate 39 is farther in the rear-ward direction from the exposure aperture 35 by a thickness of the light-shielding sheet 4. This is for the purpose of avoiding changes in the photo film surface relative to the taking lens 22 due to existence and lack of the light-shielding sheet 4 behind the photo filmstrip 3. When the back lid 31 is closed, a lock claw 31*a* is inserted in a lock hole 21*a* of the camera body 21, to lock the back lid 31. Upon locking of the back lid 31, a state of a lid switch 58 is changed. See FIG. 9.

Figure 9:
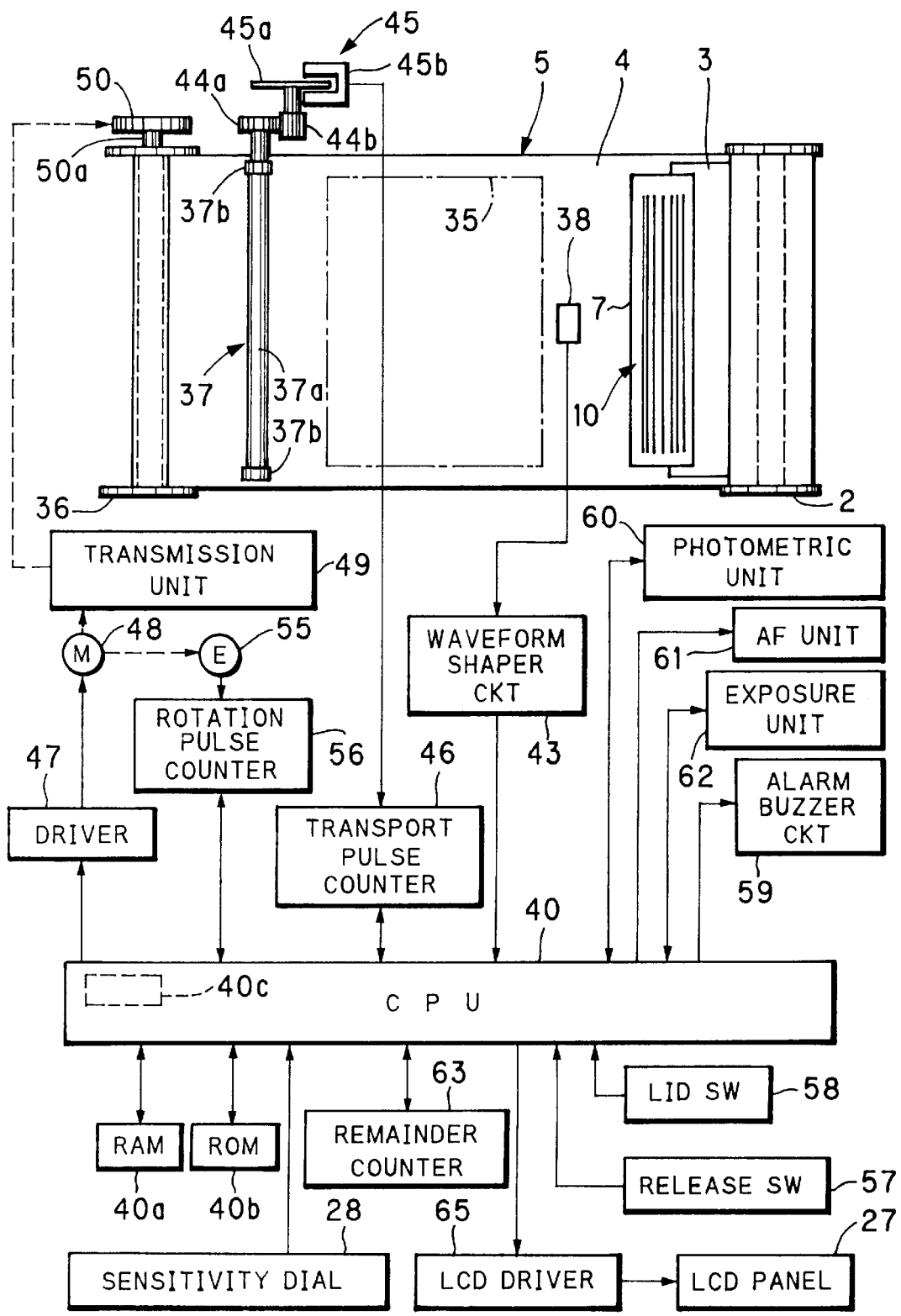
FIG. 9 is a schematic view illustrating mechanical and electrical structures of the camera.

In FIG. 9 illustrating electrical construction of the camera 20, a CPU 40 is connected to a RAM 40*a* and a ROM 40*b*. RAM 40*a* is a memory for storing information including photosensitivity, a photo film type, and available frame number read from the bar code 10, and also a work memory for data required for various controls in a temporary manner. ROM 40*b* stores programs for executing the various controls. A register 40*c* is disposed in CPU 40 for storing the photosensitivity in a temporary manner.

CPU 40 controls components of the camera 20 according to the programs of ROM 40*b*, and detects information of the bar code 10 to recognize the photosensitivity, the photo film type and the available frame number. When the photosensitivity dial 28 is rotationally moved to change the camera from the manual photosensitivity setting mode to the automatic photosensitivity setting mode, CPU 40 reads the photosensitivity stored in RAM 40*a*, and overwrites it to the photosensitivity location in the register 40*c*, which has been stored a manually set photosensitivity. In contrast, when the photosensitivity dial 28 is rotationally moved to change the camera from the automatic photosensitivity setting mode to the manual photosensitivity setting mode, CPU 40 overwrites a manually set photosensitivity to the photosensitivity location in the register 40*c*, which has been stored the photosensitivity from the bar code 10 and RAM 40*a*. Note that, in setting of the first frame, the bar code 10 is read irrespective of rotational positions of the sensitivity dial 28. The information including the photosensitivity is constantly written to RAM 40*a*.

The photoelectric signal from the bar code sensor 38 is sent to a waveform shaper circuit 43, which shapes the photoelectric signal by use of a suitably determined threshold level into a reflection signal at one of three levels. The reflection signal has the Low (L) level if the bar code sensor 38 detects the light-shielding sheet 4 or the black bars 14*a* and 14*b* of the bar code 10. The reflection signal has the High (H) level if the bar code sensor 38 detects the white bars 15*a* and 15*b* or the starting quiet zone 11 or the ending quiet zone 13.

When the photo filmstrip 3 is confronted with the bar code sensor 38, then the waveform shaper circuit 43 generates the signal at an "M level", which is lower than the High (H) level and higher than the Low (L) level, because an emulsion surface of the photo filmstrip 3 has a reflection factor higher than the light-shielding sheet 4 and the black bars and lower than the white bars and the starting quiet zone 11 and the ending quiet zone 13. The reflection signal is sent to CPU 40 for detection of the photo filmstrip 3 and reading of the bar code 10.

A photo film transport encoder 45 is associated with the shaft 37*a* of the driven roller 37 via gears 44*a* and 44*b*. The photo film transport encoder 45 includes an encoder disk or plate 45a, a photo interrupter 45b and a pulse generator (not shown). The encoder disk 45a has a plurality of radially and regularly arranged slits or recesses, and is rotatable together with the shaft 37a. The photo interrupter 45b monitors passage of the slits or the recesses in the encoder disk 45a. The pulse generator is connected to the photo interrupter 45b, and generates an encode pulse upon detection of one of the slits at the photo interrupter 45b. It is to be noted that a surface of the encoder disk may have a pattern of portions of low reflection and high reflection instead of the slits or recesses. A reflection type of photo sensor may be used instead of the photo interrupter 45b to generate the encode pulse.

The photo film transport encoder 45 generates one encode pulse each time that the driven roller 37 makes rotation at a predetermined angle, or each time that the sheet-fitted photo film 5 is transported by a predetermined length. This encode pulse is herein referred to as "transport pulse". There occur approximately 40 transport pulses when the photo film-strip 3 is moved by one frame. The transport pulses are sent to a transport pulse counter 46.

The transport pulse counter 46 is connected to measure a length at which the photo filmstrip 3 is transported. CPU 40 resets a count value Cs of the transport pulse counter 46 as a zero (0). Each time that one transport pulse is generated, CPU 40 steps up the count value Cs of the transport pulse counter 46. The count value Cs is used in CPU 40 for the purpose of the first frame setting of the photo filmstrip 3 and the one-frame advancement. According to the change in the count value Cs, movement of the rear end of the light-shielding sheet 4 past the driven roller 37 is detected.

A driver 47 is controlled by CPU 40 to drive a winder motor 48. Rotation of the winder motor 48 is mechanically transmitted by a transmission unit 49 to a gear 50. The drive shaft 50a under the gear 50 causes the take-up spool 36 to rotate. A spool rotation encoder 55 is connected to the winder motor 48. The spool rotation encoder 55 is structurally the same as the photo film transport encoder 45. The spool rotation encoder 55 generates one encode pulse each time that the winder motor 48 makes rotation at a predetermined angle. This encode pulse is herein referred to as "rotation pulse". There occur approximately 7 transport pulses when the photo filmstrip 3 is moved by one millimeter (1 mm) during movement of the connective tape 7 past the bar code sensor 38. The rotation pulses are sent to a rotation pulse counter 56.

The rotation pulse counter 56 is used to measure widths of the respective bars of the bar code 10. CPU 40 resets a count value Cm of the rotation pulse counter 56 as a zero (0). Each time that one rotation pulse is generated, CPU 40 steps up the count value Cm of the rotation pulse counter 56. The count value Cm is sent to CPU 40. The count value Cm is also used for the purpose of stopping the winder motor 48 after the final winding of the photo filmstrip.

Note that a roll diameter about the take-up spool 36 increases according to an increase of a length of the sheet-fitted photo film 5 being wound. There is no proportionality in the relationship between the number of the rotation pulses and the transported length of the sheet-fitted photo film 5. However there is only a very small change in the roll diameter while the connective tape 7 is moved past the bar code sensor 38. The relationship between the number of the rotation pulses and the transported length of the sheet-fitted photo film 5 can be approximated proportionally. It is possible to utilize the number of the rotation pulses in measuring widths of the bars of the data bar section 12.

The release switch 57 is turned on upon depression of the shutter release button 26, generates a halfway depressed signal upon the halfway depression of the shutter release button 26, and generates a full depression signal upon the full depression of the shutter release button 26. The halfway depression signal and the full depression signal are sent to CPU 40. Note that a term "release signal" is used for both of the halfway depression signal and the full depression signal and particularly if the difference between them is irrespective.

When CPU 40 receives the release signal upon closing of the back lid 31, a first frame is set at the exposure aperture. After this, CPU 40 receives a halfway depressed signal of the shutter release button, to actuate a photometric unit 60 and an autofocussing (AF) unit 61. In response to a fully depressed signal of the shutter release button, CPU 40 actuates an exposure unit 62.

The lid switch 58 is disposed in the lock hole 21a, and turned on and off upon opening/closing movement of the back lid 31 to output an open/closed status signal representing an open/closed status of the back lid 31. If the back lid 31 is open, then the open/closed status signal is at the High (H) level. If the back lid 31 is closed, then the open/closed status signal is at the Low (L) level. The open/closed status signal is sent to CPU 40 which recognizes the open/closed status of the back lid 31.

When there remains only one available frame, an alarm buzzer circuit 59 generates alarm sound to inform the user of this situation. The photometric unit 60 has a photometric sensor disposed inside the viewfinder 25, measures subject brightness, and sends a photometric result of the brightness to CPU 40. CPU 40 calculates the apertures stop and the shutter speed optimized for taking an exposure according to the photometric result and the photosensitivity of the photo film. The AF unit 61 includes rangefinding sensors and a motor. The rangefinding sensors are respectively disposed inside the rangefinding windows 24a and 24b. The motor drives the taking lens 22 for the purpose of a focussing operation.

Figure 9A:
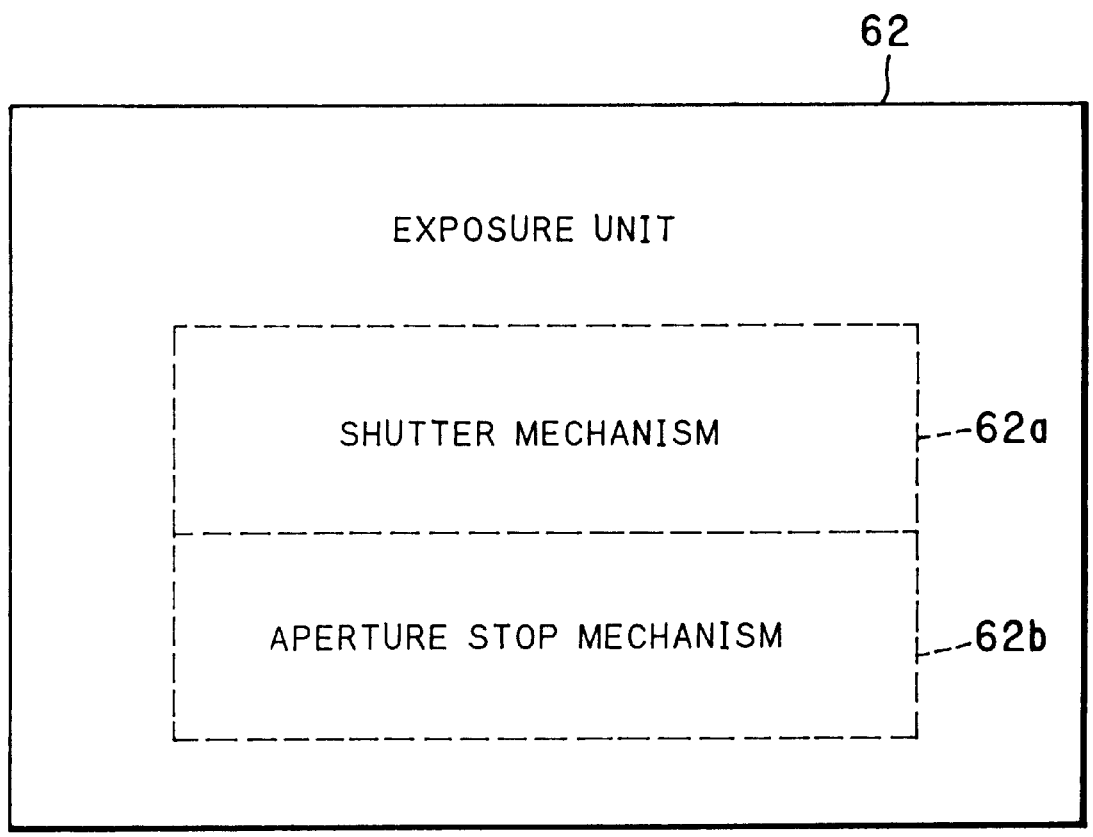
FIG. 9A is a schematic view illustrating an exposure unit.

As illustrated in FIG. 9A, the exposure unit 62 is constituted by a shutter mechanism 62a and an aperture stop mechanism 62b. Upon the full depression of the shutter release button 26, the shutter mechanism 62a and the aperture stop mechanism 62b are driven. The exposure unit 62 in combination with CPU 40 constitute a means for an exposure control. CPU 40 determines a value of an exposure stop at which the aperture stop mechanism 62b is actuated, and determines a shutter speed at which the shutter mechanism 62a is actuated, so that the photo filmstrip 3 is exposed at an optimized exposure amount. Each time after the shutter mechanism 62a is driven for exposing one frame, the exposure unit 62 sends a finish signal to CPU 40.

A remainder counter 63 counts the remaining ones of the available frames. The initial number of the available frames has been obtained according to the type information read from the bar code 10, and set by CPU 40 as an initial value of a count value Cf. The initial value set as the count value Cf is 15 if for the 120 standard type, 8 if for the 120 half type, and 30 if for the 220 type. If a variant camera of the present invention is adapted to a frame size different from those, an initial value for the count value Cf should be determined in a manner suitable to the frame size.

CPU 40 decrementally steps the count value Cf of the remainder counter 63 by one upon finish of exposing one frame. It is to be noted that RAM 40a may be used for counting the remaining number of the available frames instead of using the remainder counter 63. Also RAM 40a may be used for counting the transport pulse instead of using the transport pulse counter 46, and counting the rotation pulse instead of using the rotation pulse counter 56.

Figure 10A:
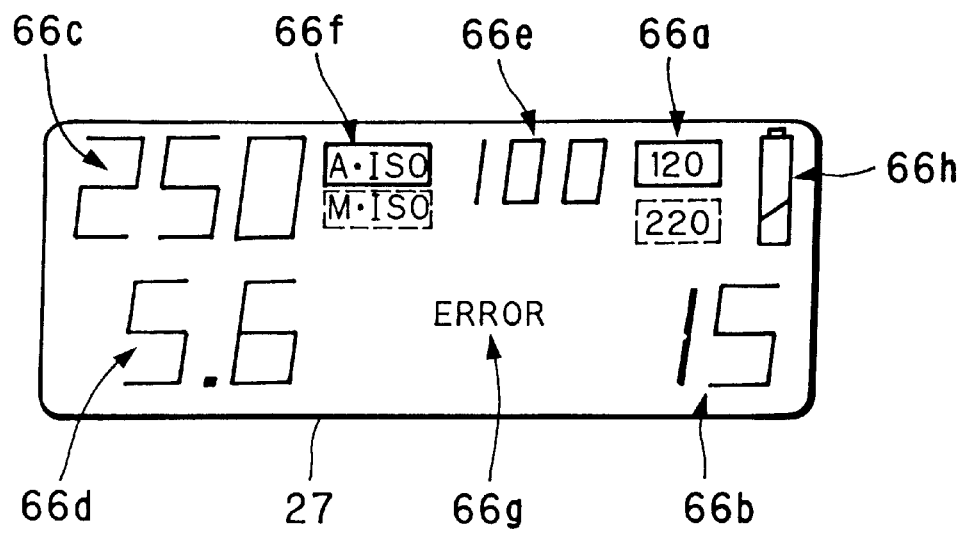
FIG. 10A is an explanatory view in plan, illustrating a liquid crystal display panel in which an automatic mode is indicated.
Figure 10B:
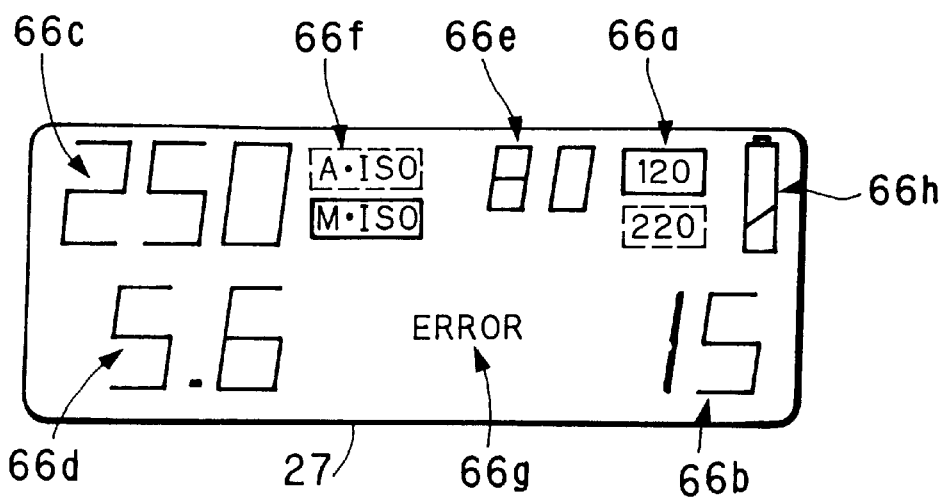
FIG. 10B is an explanatory view in plan, illustrating the liquid crystal display panel in which a manual mode is indicated.

A display driver 65 causes the LCD panel 27 to display the number of the remaining ones of the frames and the photosensitivity. In FIGS. 10A and 10B, the LCD panel 27 includes a photo film type region 66a, a frame number region 66b, a shutter speed region 66c, an aperture stop region 66d, a photosensitivity region 66e, an A/M mode region 66f, an error region 66g and a battery region 66h. The photo film type region 66a indicates either of 120 and 220 types of the roll photo film 1. The frame number region 66b indicates the number of exposed frames. The shutter speed region 66c and the aperture stop region 66d respectively indicate the shutter speed and the aperture stop both determined by CPU 40. The photosensitivity region 66e indicates either the predetermined photosensitivity of the photo filmstrip 3 read from the bar code 10, or the designated photosensitivity selected by operation the photosensitivity dial 28. The A/M mode region 66f indicates the status of the predetermined photosensitivity derived from the bar code 10 as in FIG. 10A, and indicates the status of the designated photosensitivity set by the photosensitivity dial 28 as in FIG. 10B. The error region 66g indicates a blinking sign upon occurrence of an error or trouble. The battery region 66h indicates a blinking sign when the remainder of charge of battery becomes small.

In FIG. 10A, "A-ISO" appears in the A/M mode region 66f to represent the automatic photosensitivity setting mode while the letter A of the auto input indicia 70 is pointed by the pointer 30. In FIG. 10B, "M-ISO" appears in the A/M mode region 66f to represent the manual photosensitivity setting mode while any of the numerals in the numeral train 29 is pointed by the pointer 30.

The photo film type region 66a and the photosensitivity region 66e are caused to show the information according to what is stored in RAM 40a. The frame number region 66b is caused to show the count value Cf of the remainder counter 63, and thus is a decremental frame counter. The frame number region 66b makes it possible for the user to find the number of remaining ones of the available frames with great ease.

The operation of the present embodiment is described now by referring to In FIGS. 11–15. To load the roll photo film 1, the back lid 31 of the camera body 21 is kept open. The pressure plate 39 is set by sliding to the positions of the 120 type or the 120 type according to the type of the roll photo film 1 to be inserted.

Then the shaft 32a is engaged with the axial hole 2c of the spool 2, to insert the roll photo film 1 into the loader chamber 32. The adhesive closing tape 6 is peeled away before the leader portion 4a of the light-shielding sheet 4 is unfolded and inserted in the slot 36a of the take-up spool 36. The claw 36b is fitted in the hole 4b. The back lid 31 is closed next.

Figure 11:
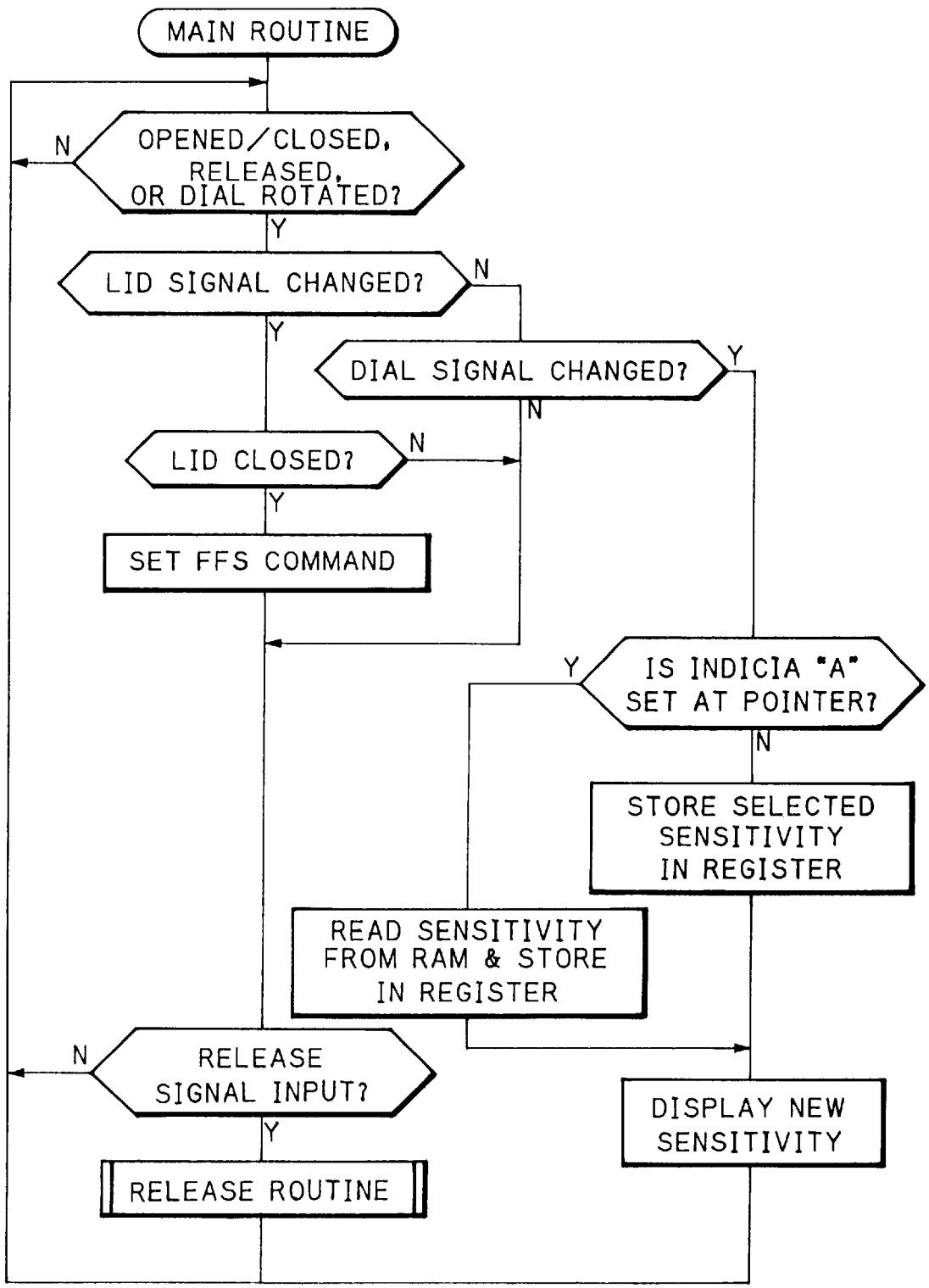
FIG. 11 is a flow chart illustrating a main routine.
Figure 13:
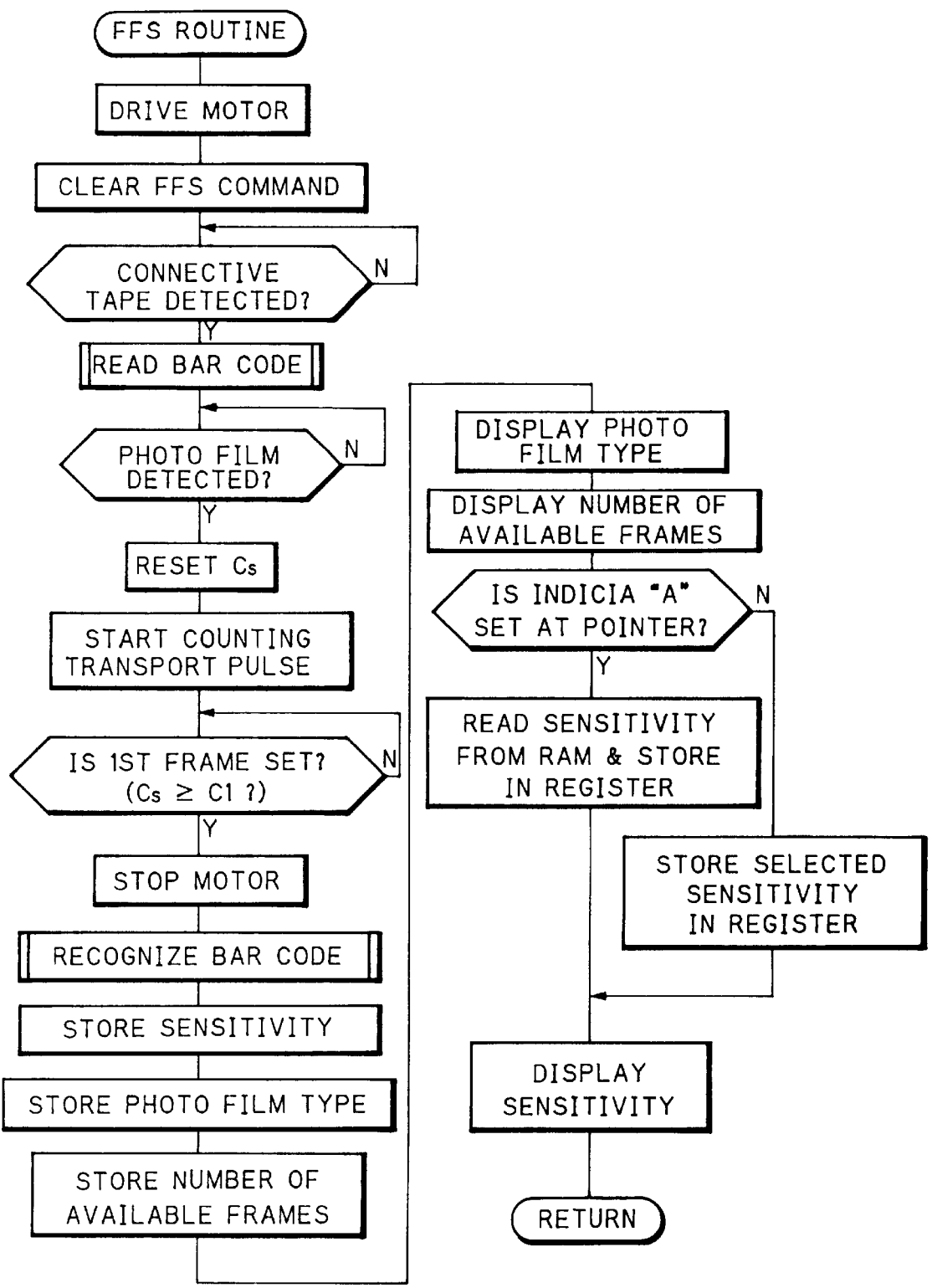
FIG. 13 is a flow chart illustrating an FFS routine in which a bar code is read and photosensitivity is indicated.

CPU 40 regularly executes the main routine depicted in FIG. 11, and constantly monitors the release signal at the release switch 57, the open/closed status signal at the lid switch 58 and a dial operating signal at the photosensitivity dial 28. Upon closing of the back lid 31, the signal of the lid switch 58 is changed from the High (H) level to the Low (L) level. CPU 40 sets an FFS command to a register inside CPU 40 for the purpose of the first frame setting.

If there is no change in the open/closed status signal from the lid switch 58, then CPU 40 evaluates whether the dial operating signal from the photosensitivity dial 28 is changed. If the letter "A" of the auto input indicia 70 is set at the pointer 30 after setting the photosensitivity dial 28, CPU 40 reads the photosensitivity from RAM 40a and sets the photosensitivity in the register 40c. This photosensitivity has been read from the bar code 10 before setting of the first frame, as will be described later in detail. In contrast, if any numeral of the numeral train 29 is set at the pointer 30 after setting the photosensitivity dial 28, CPU 40 reads the selected photosensitivity associated with the set numeral and sets it in the register 40c.

According to the photosensitivity set in the register 40c, the indication at the photosensitivity region 66e in the LCD panel 27 is changed. The indicia "A-ISO" or "I-ISO" appears selectively in the A/M mode region 66f according to whether or not the letter A of the auto input indicia 70 is pointed by the pointer 30. It is to be noted that, if any numeral in the numeral train 29 is initially pointed by the pointer 30, the photosensitivity read from the bar code 10 is written to RAM 40a. If the photosensitivity dial 28 is rotated during the photographing operation to set the letter A of the auto input indicia 70 at the pointer 30, then the photosensitivity is read from RAM 40a and written to the register 40c in an overwriting manner. What is stored in 40c is renewed.

After the back lid 31 is closed, the shutter release button 26 is depressed either halfway or fully. A release signal is generated by the release switch 57 and input to CPU 40. Responsively CPU 40 executes a release routine.

At first in the release routine, it is evaluated whether the FFS command is set in the register as depicted in FIG. 12. The FFS command, as mentioned above, has been set in the register upon closing of the back lid 31. CPU 40 executes the FFS routine of FIG. 13 without executing the photographing routine. Note that the FFS routine may be executed immediately after the back lid 31 is closed without waiting a receipt of the release signal.

In the FFS routine, CPU 40 drives the winder motor 48 to rotate the take-up spool 36. Also CPU 40 clears the FFS command from the register, so that next depression of the shutter release button 26 will start the photographing routine.

When the take-up spool 36 is rotated, the light-shielding sheet 4 of the sheet-fitted photo film 5 is wound about the take-up spool 36, to transport the light-shielding sheet 4 through the photo film passageway 34 toward the take-up spool 36 and away from the loader chamber 32 at the spool 2. Upon the start of transporting the sheet-fitted photo film 5, CPU 40 starts detecting the connective tape 7 at the bar code sensor 38.

In the course of winding the light-shielding sheet 4 about the take-up spool 36, the connective tape 7 moves to the bar code sensor 38. At first the starting quiet zone 11 of the bar code 10 becomes confronted with the bar code sensor 38, to change the reflection signal from the waveform shaper circuit 43 from the Low (L) level to the High (H) level. In response to this change, CPU 40 recognizes presence of the connective tape 7, to start measuring widths of the bars of the data bar section 12 to read the bar code 10.

For the measurement of the bar width, at first CPU 40 actuates the rotation pulse counter 56 upon the change of the reflection signal to the High (H) level when the starting quiet zone 11 is detected. The winder motor 48 is caused to rotate by a predetermined angle, to cause the spool rotation encoder 55 to generate the rotation pulse. The count value Cm of the rotation pulse counter 56 is incrementally stepped by one.

Then the reflection signal changes from the High (H) level to the Low (L) level. CPU 40 responsively resets the count value Cm as zero (0) in the rotation pulse counter 56, before the rotation pulse counter 56 is caused to count the rotation pulses. Note that the change in the reflection signal to the Low (L) level occurs upon detection of the wide black bar 14a or the narrow black bar 14b arranged next to the starting quiet zone 11.

When a first one of the black bars is moved past the bar code sensor 38, the reflection signal changes from the Low (L) level to the High (H) level. To be precise, upon confrontation of the wide white bar 15a or the narrow white bar 15b with the bar code sensor 38, CPU 40 reads the count value Cm from the rotation pulse counter 56 upon a change in the reflection signal, and writes it to RAM 40a as first width data. Again the count value Cm of the rotation pulse counter 56 is reset as zero (0), before the rotation pulse is counted. The first width data is the number of rotation pulses generated while the first black bar moves past the bar code sensor 38.

After each white bar is moved past the bar code sensor 38, another black bar becomes confronted with the bar code sensor 38, to change the reflection signal to the Low (L) level. In a manner similar to the above, CPU 40 reads the count value Cm, and stores it in RAM 40a as second width data. Then CPU 40 resets the count value Cm as zero (0) in the rotation pulse counter 56, again to count the rotation pulses. The second width data is the number of the rotation pulses generated while the second bar being white moves past the bar code sensor 38. Subsequently CPU 40 obtains third width data and so on by reading the count value Cm in the rotation pulse counter 56 upon a change in the reflection signal, to store the width data in RAM 40a.

When the ending quiet zone 13 is moved past the bar code sensor 38, the photo filmstrip 3 comes to the bar code sensor 38 to change the reflection signal to the "M" level. Upon the reflection signal, CPU 40 detects that the connective tape 7 has passed the bar code sensor 38 and that the photo filmstrip 3 has come to the bar code sensor 38. To set a first frame of the photo filmstrip 3 behind the exposure aperture 35, the count value Cs of the transport pulse counter 46 is reset as zero (0), before the transport pulse counter 46 is started to count the transport pulse. Note that the count value Cm of the rotation pulse counter 56, which is finally obtained upon the change of the reflection signal to the "M" level, is not written to RAM 40a.

The driven roller 37 is caused to rotate by transportation of the sheet-fitted photo film 5. The transport pulse is generated each time that the photo filmstrip 3 is transported as much as a predetermined length, to step up the count value Cs in the transport pulse counter 46. Also CPU 40 stops the rotation pulse counter 56 from counting the rotation pulse.

CPU 40 monitors the count value Cs of the transport pulse counter 46. When the count value Cs becomes a predetermined value C1, the winder motor 48 is stopped to stop transporting the sheet-fitted photo film 5. The value C1 is the number of the transport pulses corresponding to a distance from the bar code sensor 38 to the driven roller 37. The first frame is set behind the exposure aperture 35 to stand by for a first exposure to be taken.

After stopping the winder motor 48, CPU 40 evaluates the width data stored in RAM 40a. If the width data is evaluated to represent a wide bar, then CPU 40 sets a logical value one (1). If the width data represents a narrow bar, then CPU 40 sets a logical value zero (0). Both logical values are stored in RAM 40a.

This evaluating operation is more precisely described now. The beginning three bars of the bar code 10 are predetermined to include a single wide bar 14a or 15a and two narrow bars 14b or 15b. Therefore a total of the first, second and third width data is 4.5 times as great as width data of a single narrow bar. There is no problem in proportionally approximating a relationship between the width data and the width of each bar while the connective tape 7 is moved past the bar code sensor 38.

In accordance with the total of the first, second and third width data, CPU 40 calculates the number of rotation pulses corresponding to an average of the width of each wide bar and that of each narrow bar. This pulse number is herein referred to as reference data. Then CPU 40 compares each width data with the reference data. If the width data is greater than the reference data, then the bar represented by the width data is found wide, to set the logical value (1). If in turn the width data is smaller than the reference data, then the bar represented by the width data is found narrow, to set the logical value (0).

After evaluating the logical value, CPU 40 evaluates which of the 120 standard type, the 120 half type and the 220 type the roll photo film 1 is in accordance with the type data constituted by a combination of logical values associated with the first, second and third width data. The white code and the black code are determined according to the combination of logical values of the ten remaining bits. The photosensitivity is discerned from the combination of those codes.

If there occur problems in reading the bar code, CPU 40 stops the winder motor 48 to cause an error indicia to blink in the error region 66g for warning the user. Such problems include shortage in the number of the width data below 13, excess in the number of the width data over 13, lack of coincidence in a combination of a white code and a black code with any of the preset combinations, and conspicuous differences of greatness of each width data from originally expected values.

The photosensitivity and the photo film type of the photo filmstrip 3 read from the bar code 10 are written to RAM 40a. The number of the available frames of the photo filmstrip 3 is obtained from the photo film type, and is written to RAM 40a. Thereafter CPU 40 sets the available frame number in the remainder counter 63 as an initial value of the count value Cf. Then CPU 40 causes the LCD panel 27 to display the number of available frames or the count value Cf in the frame number region 66b, and to display the photo film type of "120" or "220" in the photo film type region 66a according to the information stored in RAM 40a.

Then CPU 40 evaluates whether the letter "A" of the auto input indicia 70 on the photosensitivity dial 28 is set at the pointer 30. If it is, then the photosensitivity is read from RAM 40a, and set in the register 40c. If any numeral in the numeral train 29 is set at the pointer 30, then the selected photosensitivity according to the numeral is stored in the register 40c. In either case the photosensitivity in the register 40c is externally indicated in the photosensitivity region 66e. If the letter A is pointed, CPU 40 causes the A/M mode region 66f to indicate "A-ISO" indicating automatic setting of photosensitivity. If any numeral in the numeral train 29 is pointed, CPU 40 causes the A/M mode region 66f to indicate "M-ISO" indicating manual setting of photosensitivity. Afterwards the first frame finishes being set.

If the roll photo film 1 of the 120 type and having the ISO photosensitivity of 100, the LCD panel 27 is caused to display "120" in the photo film type region 66a, "15" in the frame number region 66b, "100" in the photosensitivity region 66e and "A-ISO" in the A/M mode region 66f to indicate the automatic photosensitivity setting mode. See FIG. 10A.

Figure 14:
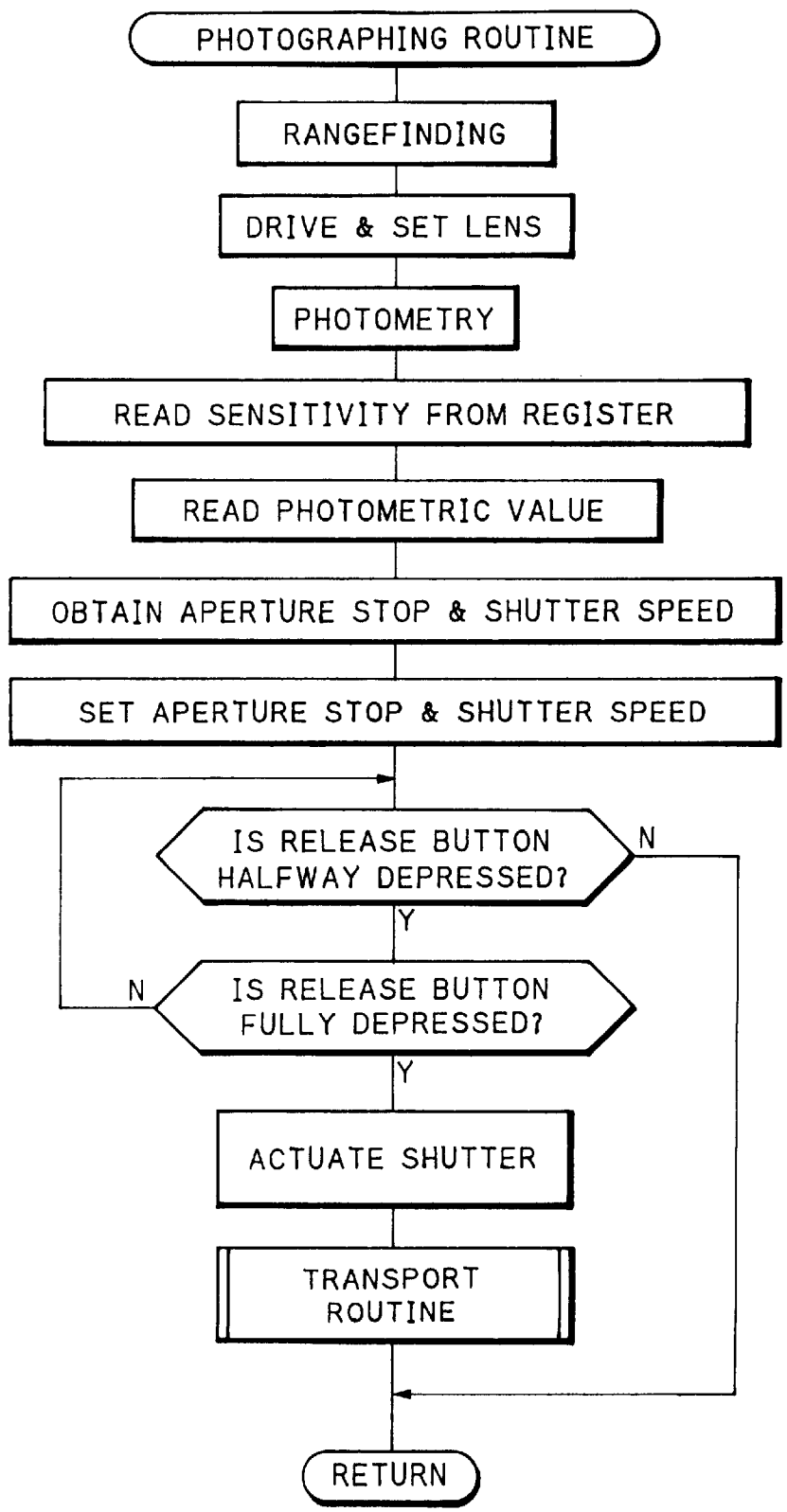
FIG. 14 is a flow chart illustrating a photographing routine.
Figure 15:
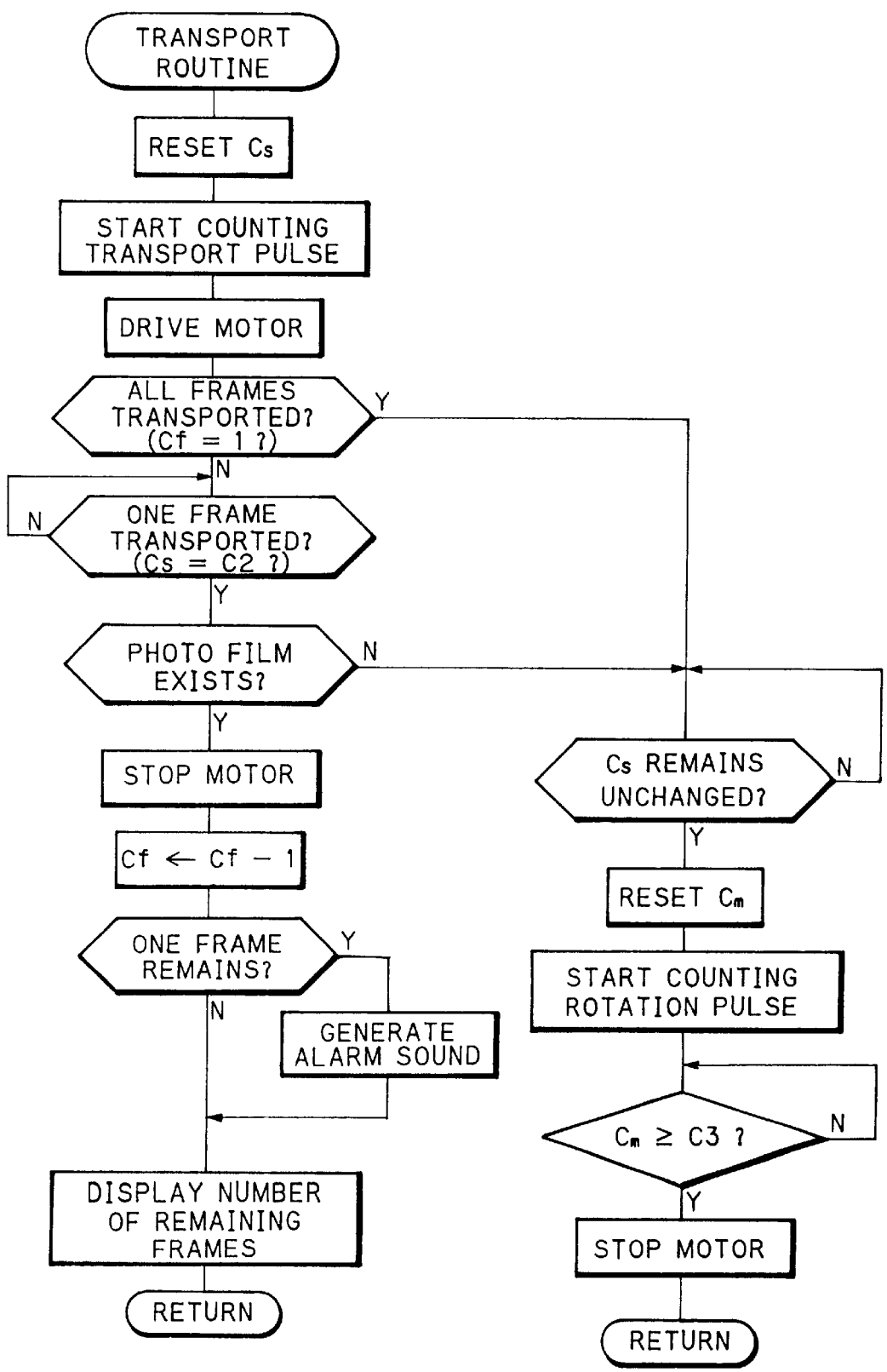
FIG. 15 is a flow chart illustrating a transport routine.

After the first frame setting, the shutter release button 26 is fully depressed to take an exposure according to the photographing routine of FIG. 14. In the beginning of this routine, CPU 40 effects the rangefinding by operating the AF unit 61 upon halfway depression of the shutter release button 26, to measure a distance. The taking lens 22 is driven and focussed according to the distance. Brightness of the photographic subject is measured by the photometric unit 60. On the basis of the photometric result and photosensitivity set in the register 40c, CPU 40 obtains the aperture stop and the shutter speed optimized for the subject, and sets them in the exposure unit 62 having a shutter mechanism. The exposure unit 62 is driven upon the full depression of the shutter release button 26. The first frame is exposed at an optimized exposure amount based on the aperture stop and the shutter speed.

When an exposure is terminated, an exposure finish signal is sent by the exposure unit 62 to CPU 40. CPU 40 executes a transport routine depicted in FIG. 15. At first CPU 40 resets the count value Cs of the transport pulse counter 46 as zero (0), and then causes the transport pulse counter 46 to start counting the transport pulse. The winder motor 48 is driven to start winding the photo filmstrip 3 about the take-up spool 36.

CPU 40 evaluates whether Cf=1 at the remainder counter 63, to determine whether all frames are exposed and transported. If Cf=1, then the photo filmstrip is wound entirely and finally. But the count value Cf is not one (1) immediately after exposing the first frame. Then CPU 40 determines that some of the frames remain unexposed, and executes a routine for one-frame advancement.

In the one-frame advancement, CPU 40 monitors the count value Cs of the transport pulse counter 46 stepped incrementally each time that the photo filmstrip 3 is transported by a predetermined length. When the count value Cs becomes a predetermined value C2, then it is evaluated whether the photo filmstrip 3 exists at the bar code sensor 38, before the winder motor 48 is stopped. The value C2 is equal to or slightly greater than the number of the transport pulses according to a length of one frame of the photo film. The photo filmstrip 3 is stopped when a second frame is positioned behind the exposure aperture 35 after winding one frame of the photo filmstrip 3 about the take-up spool 36.

After the winder motor 48 is stopped, CPU 40 steps down the count value Cf of the remainder counter 63 (Cf<—Cf-1). Then CPU 40 evaluates whether Cf=1 to check whether only one frame remains. The count value Cf is not one (1). The frame number region 66b is caused to display the number of remaining frames, for example 29, to terminate the one-frame advancing routine without generating any alarm sound.

After finishing the one-frame advancement, the shutter release button 26 is depressed to exposure a second exposure. Then CPU 40 evaluates whether all frames are exposed and transported in the same manner as above. The photo filmstrip 3 is transported by one frame. After the one-frame advancement, again CPU 40 evaluates whether only one frame remains. The indication in the frame number region 66b is changed as required. Of course one-frame advancement of the photo filmstrip 3 is effected each time after one exposure.

If the user desires to adjust exposure in taking a photograph, he or she rotates the photosensitivity dial 28 to set one numeral of the desired photosensitivity to the pointer 30. Let ISO 100 be read from the bar code 10. If the user desires an condition overexposed by ⅓ EV over ISO 100, he or she sets a numeral "80" of the desired photosensitivity on the photosensitivity dial 28 to the pointer 30. The photosensitivity set in the register 40c is changed from ISO 100 to ISO 80. Indication in the photosensitivity region 66e of the LCD panel 27 is changed from 100 to 80. The A/M mode region 66f is caused to display "M-ISO". See FIG. 10B.

The photosensitivity read from the bar code is kept stored in RAM 40a before the finish of exposing all the frames. Every time that the photosensitivity dial 28 is rotated to set the letter "A" of the auto input indicia 70 at the pointer 30, the photosensitivity is set in the register 40c by reading it from RAM 40a.

After a second last frame is exposed, the photo film-strip is advanced by one frame. Now the count value Cf becomes one (1) at the remainder counter 63. Responsively CPU 40 actuates the alarm buzzer circuit 59 to generate alarm sound. The user is warned and informed that the only one available frame remains. The frame number region 66b is caused to display the number one (1).

As the alarm sound informs that only one frame remains, the user is enabled to stand by for insertion of another roll photo film. Accordingly the user is free from being urged upon using up the roll photo film 1, in contrast with a situation where the user would become aware of reloading photo film shortly before taking another exposure.

After the final exposure is taken, CPU 40 causes the transport pulse counter 46 to operate in a manner similar to the one-frame advancement, and then drives the winder motor 48 to wind the photo filmstrip 3. As the count value Cf of the remainder counter 63 is one (1), a final winding sequence is effected. CPU 40 monitors the count value Cs of the transport pulse counter 46, and evaluates whether the count value Cs remains unchanged upon finishing increment. The unchanged state of the count value Cs means that a rear end or the trailer sheet 8b has passed the driven roller 37. In response to the finish of increment of the count value Cs, CPU 40 resets the count value Cm as zero (0) in the rotation pulse counter 56, and also starts counting the rotation pulse therein.

When the count value Cm at the rotation pulse counter 56 becomes a predetermined value C3, CPU 40 stops the winder motor 48. The value C3 is sufficiently greater than the number of the rotation pulses generated between the passage of the rear end of the light-shielding sheet 4 at the driven roller 37 and the full winding of the light-shielding sheet 4 about the take-up spool 36. The light-shielding sheet 4 including its rear end can be fully wound about the take-up spool 36 to terminate the winding operation.

After the winder motor 48 stops, the user unlocks and opens the back lid 31, to remove the take-up spool 36 from the take-up chamber 33 with the sheet-fitted photo film 5 wound thereabout. Note that it is possible to inform the user of the finish of the final winding by generating sound, causing indicia to blink in the LCD panel 27, or using any suitable external signal.

In the above embodiment, "M-ISO" and also the photosensitivity being set manually are indicated only in the manual photosensitivity setting mode. However the photosensitivity read from the bar code may be kept indicated even in the manual photosensitivity setting mode. When the photosensitivity is manually adjusted, an adjusting amount of the photosensitivity may be indicated in forms of +⅓, −⅔ or the like together with the initial photosensitivity according to the bar code.

In the above embodiment, the indicia "A-ISO" and "M-ISO" are used distinctly to indicate automatic and manual setting of photosensitivity in the LCD panel 27. Alternatively "ISO AUTO" and "ISO" may be used in such a manner that "AUTO" is additionally indicated with "ISO" which is indicated constantly and irrespective of either of those modes.

The photosensitivity dial is used for selectively setting either of the manual and automatic photosensitivity setting modes. Alternatively a pushbutton may be used as both a mode selector and a photosensitivity input device. Each time the pushbutton is pushed, a value of the photosensitivity may be stepped, either up or down, and indicated in the LCD panel. When the photosensitivity is indicated in the LCD panel, a user may stop pushing the pushbutton. After a number of pushes of the pushbutton, the letter A may be indicated in place of the photosensitivity value in the LCD panel. The camera can be so constructed that, when the letter A appears, the automatic photosensitivity setting mode may be set instead of the manual photosensitivity setting mode. For a sequence of displaying the photosensitivity values and the letter A in a chained manner by use of the pushbutton, the chain of the numerals of the photosensitivity may include the letter A in any suitable location, such as before the minimum photosensitivity, after the maximum photosensitivity, or directly before or after ISO 100, or the like.

In the above embodiment, ISO 100 is used as a general-purpose photosensitivity. The letter "A" of the auto input indicia 70 on the photosensitivity dial 28 is located near to ISO 100. Alternatively ISO 400 may be used as a general-purpose photosensitivity for near location of the letter "A" of the auto input indicia 70 on the photosensitivity dial 28.

In the above embodiment, the camera is a Brownie type and the roll photo film is either the 120 type or the 220 type. Of course the present invention is applicable to any type of camera and any type of photo film.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera for use with a roll photo film, said roll photo film including a photo filmstrip having an effective exposure region in which plural frames are formable one after another, a light-shielding leader disposed on a front end of said photo filmstrip, a light-shielding trailer disposed on a rear end of said photo filmstrip, said roll photo film being pre-wound with said trailer wound inwards and with said leader wound outwards, and including a bar code, prerecorded between a front end of said leader and said effective exposure region, for representing photo film information including information of an auto input photosensitivity value, said camera comprising:

a bar code reader for reading said bar code to detect said auto input photosensitivity value;

a variable photosensitivity input unit, externally operable, for inputting a manual input photosensitivity value;

a mode selector, externally operable, for selecting one of automatic and manual modes, said mode selector rendering said auto input photosensitivity value effective when selecting said automatic mode, and rendering said manual input photosensitivity value effective when selecting said manual mode;

an exposure control unit for controlling an amount of exposure to said effective exposure region in accordance with an effective one of said auto and manual input photosensitivity values;

a photo film take-up chamber, formed in said camera body, for taking up said roll photo film with said leader advanced thereto;

a take-up spool which is disposed in said take-up chamber in a removable manner, on which said front end of said leader is retained and which winds said roll photo film thereabout when rotated;

a drive shaft, engaged with said take-up spool, for rotating said take-up spool;

a first rotary encoder for generating a pulse representing a unit axial rotating amount of said drive shaft, said unit axial rotating amount corresponding to a unit transported amount of said roll photo film; and a counter for counting said pulse to detect an axial rotating amount of said drive shaft;

said bar code reader including:
a photo sensor for detecting a reflection level of said bar code;
a control unit for obtaining a distance where said reflection level of said bar code is stable by referring to said axial rotating amount in response to signals from said counter and said photo sensor, so as to obtain a width of said bars;
a driven roller, disposed near to said take-up spool, and rotated by said photo filmstrip in contact therewith; and
a second rotary encoder for detecting a unit roller rotating amount of said driven roller, said unit roller rotating amount being adapted to control of said photo filmstrip for one-frame advancement.

2. A camera as defined in claim 1, further comprising a memory for storing said auto input photosensitivity value read by said bar code reader, and when said automatic mode is selected in said mode selector, said auto input photosensitivity value being read from said memory as effective.

3. A camera as defined in claim 2, further comprising:

a camera body;

a photo film loader chamber, formed in said camera body, and loaded with said roll photo film;

an exposure aperture, formed in said camera body and disposed between said loader chamber and said take-up chamber, for providing said effective exposure region with an exposure;

wherein said bar code reader is disposed between said exposure aperture and said loader chamber, and reads said bar code while said leader is wound into said take-up chamber and before ia first one of said frames of said effective exposure region is set on said exposure aperture.

4. A camera as defined in claim 3, further comprising:

an aperture stop mechanism, incorporated in said camera body, disposed in front of said exposure aperture, for controlling an amount of a subject light introduced into said effective exposure region;

a shutter mechanism, incorporated in said camera body, disposed in front of said exposure aperture, operated to open/close for take said exposure to said effective exposure region;

wherein in accordance with greatness of said auto or manual input photosensitivity value, said exposure control unit controls said aperture stop mechanism to set a smaller aperture therein, and/or controls said shutter mechanism to set a higher shutter speed therein.

5. A camera as defined in claim 3, wherein said photosensitivity input unit has plural preset values of manual input photosensitivity from which said manual input photosensitivity value is selected.

6. A camera as defined in claim 3, wherein said roll photo film further includes a connective tape for securing said leader to said photo filmstrip, said bar code being disposed on said connective tape, and including plural bars arranged in a longitudinal direction of said photo filmstrip.

7. A camera as defined in claim 6, further comprising a display device for indicating which of said automatic and manual modes is selected.

8. A camera as defined in claim 7, wherein said display device further indicates said effective one of said auto and manual input photosensitivity values.

9. A camera as defined in claim 7, wherein said photosensitivity input unit includes:

a rotatable photosensitivity dial, having a train of numerals arranged near to a periphery thereof for representing manual input photosensitivity values;

a pointer, disposed near to said photosensitivity dial and directed thereto, said photosensitivity dial being rotated to set one numeral of said numeral train at said pointer, said manual input photosensitivity value being selected according to said one numeral being set;

said mode selector including an auto input indicia, disposed on said photosensitivity dial in addition to said numeral train, for selecting said automatic mode when set at said pointer.

10. A camera as defined in claim 9, wherein said auto input indicia is disposed next to one distal end of said numeral train.

11. A camera as defined in claim 9, wherein said numeral train includes a numeral of ISO 100, and said auto input indicia is disposed next to said numeral ISO 100.

12. A camera as defined in claim 7, wherein said bars include a wide black bar, a narrow black bar, a wide white bar and a narrow white bar, and said black bars are arranged alternately with said white bars, and have a lower reflection level than said white bars;

wherein said control unit obtains a first measured value by measuring said axial rotating amount during a period beginning upon detection of one of borders between said black and white bars and ending upon detection of another of said borders between said black and white bars, and said control unit compares said first measured value with one reference rotating amount, said reference rotating amount being associated with a width value narrower than a width of said wide black or white bar and wider than a width of said narrow black or white bar, said wide black or white bar being detected if said first measured value is greater than said reference rotating amount, and said narrow black or white bar being detected if said first measured value is smaller than said reference rotating amount.

13. A camera as defined in claim 12, wherein beginning N ones of said bars are detected before an (N+1)th one and following remaining ones of said bars, and said beginning N bars have widths of which a total is predetermined;

said control unit detects passage of said beginning N bars by said photo sensor in accordance with said borders between said black and white bars, said control unit obtains a second measured value by measuring said axial rotating amount while said passage of said beginning N bars is detected, said control unit stores information of said total width of said beginning N bars, and said control unit determines said reference rotating amount in accordance with said second measured value and said total width of said beginning N bars, said (N+1)th one and said following remaining ones of said bars being evaluated for a width thereof by use of said reference rotating value.

14. A camera as defined in claim 7, wherein said display device is a liquid crystal display panel.

15. A camera as defined in claim 7, wherein said roll photo film is a 120 and/or 220 type of photo film.

16. A camera as defined in claim 7, wherein said leader and said trailer are end portions of a light-shielding sheet strip, there being a lining portion extending between said end portions and overlaid on said photo filmstrip.

17. A camera as defined in claim 7, wherein said leader and said trailer are sheets respectively connected to said photo filmstrip.

18. An exposure control method for a roll photo film, said roll photo film including a photo filmstrip having an effective exposure region in which plural frames are formable one after another, a light-shielding leader disposed on a front end of said photo filmstrip, a light-shielding trailer disposed on a rear end of said photo filmstrip, said roll photo film being pre-wound with said trailer wound inwards and with said leader wound outwards, and including a bar code, prerecorded between a front end of said leader and said effective exposure region, for representing photo film information including information of an auto input photosensitivity value, said exposure control method comprising steps of:

winding said roll photo film about a take-up spool to which said front end of said leader is retained;

detecting an axial rotating amount of said take-up spool, said axial rotating amount corresponding to a transported amount of said roll photo film;

detecting a reflection level of said bar code at a photo sensor;

obtaining a distance where said reflection level of said bar code is stable by referring to said axial rotating amount in response to a signal from said photo sensor, so as to obtain a width of said bars;

reading said bar code to detect said auto input photosensitivity value;

selecting one of automatic and manual modes, said auto input photosensitivity value being rendered effective when selecting said automatic mode, and rendering a manual input photosensitivity value being rendered effective when selecting said manual mode, said manual input photosensitivity value being determinable through a variable photosensitivity input unit; and controlling an amount of exposure to said effective exposure region in accordance with an effective one of said auto and manual input photosensitivity values.

19. An exposure control method as defined in claim 18, wherein said photosensitivity input unit has plural preset values of manual input photosensitivity from which said manual input photosensitivity value is selected.

20. An exposure control method as defined in claim 19, further comprising a step of indicating which of said automatic and manual modes is selected.

21. An exposure control method as defined in claim 20, wherein said roll photo film further includes a connective tape for securing said leader to said photo filmstrip, said bar code being disposed on said connective tape, and including plural bars arranged in a longitudinal direction of said photo filmstrip.

22. An exposure control method as defined in claim 21, wherein said bars include a wide black bar, a narrow black bar, a wide white bar and a narrow white bar, and said black bars are arranged alternately with said white bars, and have a lower reflection level than said white bars;

further comprising steps of:

obtaining a first measured value by measuring said axial rotating amount during a period beginning upon detection of one of borders between said black and white bars and ending upon detection of another of said borders between said black and white bars; and comparing said first measured value with one reference rotating amount, said reference rotating amount being associated with a width value narrower than a width of said wide black or white bar and wider than a width of said narrow black or white bar, said wide black or white bar being detected if said first measured value is greater than said reference rotating amount, and said narrow black or white bar being detected if said first measured value is smaller than said reference rotating amount.

23. An exposure control method as defined in claim 22, wherein beginning N ones of said bars are detected before an (N+1)th one and following remaining ones of said bars, and said beginning N bars have widths of which a total is predetermined;

further comprising steps of:

detecting passage of said beginning N bars by said photo sensor in accordance with said borders between said black and white bars;

obtaining a second measured value by measuring said axial rotating amount while said passage of said beginning N bars is detected; and determining said reference rotating amount in accordance with said second measured value and said total width of said beginning N bars, said (N+1)th one and said following remaining ones of said bars being evaluated for a width thereof by use of said reference rotating value.

24. A camera for use with a roll photo film, said roll photo film including a photo filmstrip having an effective exposure region in which plural frames are formable one after another, a light-shielding leader disposed on a front end of said photo filmstrip, a light-shielding trailer disposed on a rear end of said photo filmstrip, said roll photo film being pre-wound with said trailer wound inwards and with said leader wound outwards, and including a bar code, prerecorded between a front end of said leader and said effective exposure region, for representing photo film information including information of an auto input photosensitivity value, said camera comprising:

a camera body;

a bar code reader for reading said bar code to detect said auto input photosensitivity value;

a variable photosensitivity input unit, externally operable, for inputting a manual input photosensitivity value;

a mode selector, externally operable, for selecting one of automatic and manual modes, said mode selector rendering said auto input photosensitivity value effective when selecting said automatic mode, and rendering said manual input photosensitivity value effective when selecting said manual mode;

an exposure control unit for controlling an amount of exposure to said effective exposure region in accordance with an effective one of said auto and manual input photosensitivity values;

a memory for storing said auto input photosensitivity value read by said bar code reader, wherein when said automatic mode is selected in said mode selector, said auto input photosensitivity value is read from said memory as effective;

a photo film take-up chamber, formed in said camera body;

a photo film loader chamber, formed in said camera body, and loaded with said roll photo film; and an exposure aperture, formed in said camera body and disposed between said loader chamber and said take-up chamber, for providing said effective exposure region with an exposure;

wherein said bar code reader is disposed between said exposure aperture and said loader chamber, and reads said bar code while said leader is wound into said take-up chamber and before a first one of said frames of said effective exposure region is set on said exposure aperture.

25. A camera as defined in claim 24, wherein the photosensitivity input unit includes:

a rotatable photosensitivity dial, having a train of numerals arranged near to a periphery thereof for representing manual input photosensitivity values;

a pointer, disposed near to said photosensitivity dial and directed thereto, said photosensitivity dial being rotated to set one numeral of said numeral train at said pointer, said manual input photosensitivity value being selected according to said one numeral being set;

said mode selector including an auto input indicia, disposed on said photosensitivity dial in addition to said numeral train, for selecting said automatic mode when set at said pointer.

26. A camera as defined in claim 25, wherein said auto input indicia is disposed next to one distal end of said numeral train.

27. A camera for use with a roll photo film, said roll photo film including a photo filmstrip having an effective exposure region in which plural frames are formable one after another, a light-shielding leader disposed on a front end of said photo filmstrip, a light-shielding trailer disposed on a rear end of said photo filmstrip, said roll photo film being pre-wound with said trailer wound inwards and with said leader wound outwards, and including a bar code, prerecorded between a front end of said leader and said effective exposure region, for representing photo film information including information of an auto input photosensitivity value, said camera comprising:

a photo film take-up chamber, formed in said camera body;

a photo film loader chamber, formed in said camera body, and adapted to be loaded with said roll photo film;

an exposure aperture, formed in said camera body and disposed between said loader chamber and said take-up chamber, for providing said effective exposure region with an exposure;

a bar code reader disposed between said exposure aperture and said loader chamber for reading said bar code to detect said auto input photosensitivity value;

a variable photosensitivity input unit, externally operable, for inputting a manual input photosensitivity value;

a mode selector, externally operable, for selecting one of automatic and manual modes, said mode selector rendering said auto input photosensitivity value effective when selecting said automatic mode, and rendering said manual input photosensitivity value effective when selecting said manual mode;

an exposure control unit for controlling an amount of exposure to said effective exposure region in accordance with an effective one of said auto and manual input photosensitivity values a rotatable photosensitivity dial, having a train of numerals arranged near to a periphery thereof for representing manual input photosensitivity values; and a pointer, disposed near to said photosensitivity dial and directed thereto, said photosensitivity dial being rotated to set one numeral of said numeral train at said pointer, said manual input photosensitivity value being selected according to said one numeral being set;

said mode selector including an auto input indicia, disposed on said photosensitivity dial in addition to said numeral train, for selecting said automatic mode when set at said pointer.

28. A camera as defined in claim 27, wherein said auto input indicia is disposed next to one distal end of said numeral train.

* * * * *